United States Patent
Kiyuna et al.

(10) Patent No.: US 7,840,357 B2
(45) Date of Patent: Nov. 23, 2010

(54) METHOD OF EVALUATING CHROMOSOME STATE AND EVALUATION SYSTEM

(75) Inventors: Tomoharu Kiyuna, Tokyo (JP); Kenji Okajima, Tokyo (JP); Hiroaki Torii, Tokyo (JP); Ken' ichi Kamijo, Tokyo (JP); Masahiko Kuroda, Tokyo (JP); Keiichi Yoshida, Tokyo (JP); Kiyoshi Mukai, Tokyo (JP)

(73) Assignee: NEC Corporation, Tokyo (JP)

( * ) Notice: Subject to any disclaimer, the term of this patent is extended or adjusted under 35 U.S.C. 154(b) by 1088 days.

(21) Appl. No.: 10/565,669

(22) PCT Filed: Jul. 29, 2004

(86) PCT No.: PCT/JP2004/010852

§ 371 (c)(1),
(2), (4) Date: Jan. 24, 2006

(87) PCT Pub. No.: WO2005/010206

PCT Pub. Date: Feb. 3, 2005

(65) Prior Publication Data

US 2006/0246458 A1 Nov. 2, 2006

(30) Foreign Application Priority Data

Jul. 29, 2003 (JP) ............................ 2003-282122

(51) Int. Cl.
*G06F 19/00* (2006.01)
*G06K 9/00* (2006.01)
*G06K 9/20* (2006.01)
*G06K 9/36* (2006.01)

(52) U.S. Cl. ........................ 702/19; 382/128; 382/133; 382/282; 382/286

(58) Field of Classification Search ....................... None
See application file for complete search history.

(56) References Cited

U.S. PATENT DOCUMENTS 7,136,540 B2 * 11/2006 Kiyuna ...................... 382/282

FOREIGN PATENT DOCUMENTS

| JP | 5-172810 A | 7/1993 |
| JP | 2001-92980 A | 4/2001 |

OTHER PUBLICATIONS

A. P. Dempster, N. M. Laird, and D. B. Rubin; "Maximum Likelihood from Incomplete Data via the *EM* Algorithm"; J. Roy. Stat. Soc.; 1977; vol. 30; pp. 205-248.

Luis A. Parada, et al. "Chromosome Positioning in the Interphase Nucleus," Trends in Cell Biology, vol. 12, No. 9, Sep. 2002.

Hideyuki Tanaba, "Chromosome Territory: Recent Advancement of Studies on Interphase Chromosome Positioning in Relation to Nuclear Architecture," Environmental Mutagen Research, vol. 25, No. 1, 2003.

T. Cremer, et al. "Chromosome Territories, Nuclear Architecture and Gene Regulation in Mammalian Cells," Nature Reviews, Genetics, vol. 2, Apr. 2001.

* cited by examiner

*Primary Examiner*—Lori A Clow
(74) *Attorney, Agent, or Firm*—Sughrue Mion, PLLC

(57) ABSTRACT

A method of evaluating a cell state based on information of an image taken of a cell containing a chromosome territory is provided. This method includes extracting the chromosome territory from the image (S20), standardizing a positioning state of the chromosome territory and then quantifying the positioning state (S22), and evaluating the cell state based on the quantified positioning state of the chromosome territory (S26).

23 Claims, 17 Drawing Sheets

FIG. 11
(a) 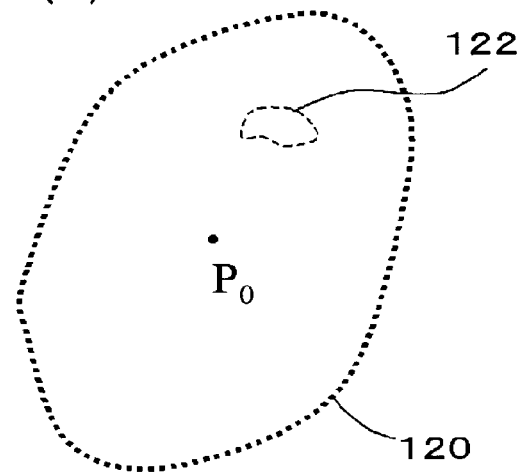
(b) 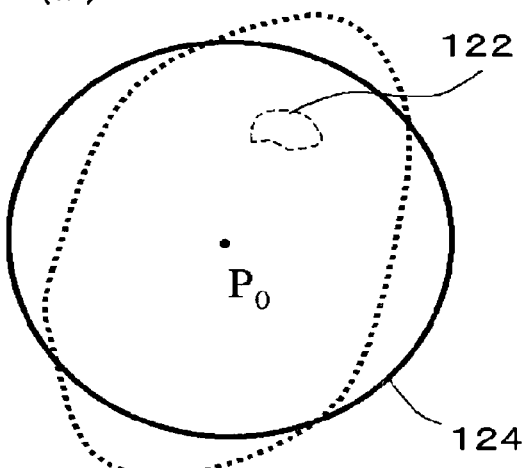
(c) 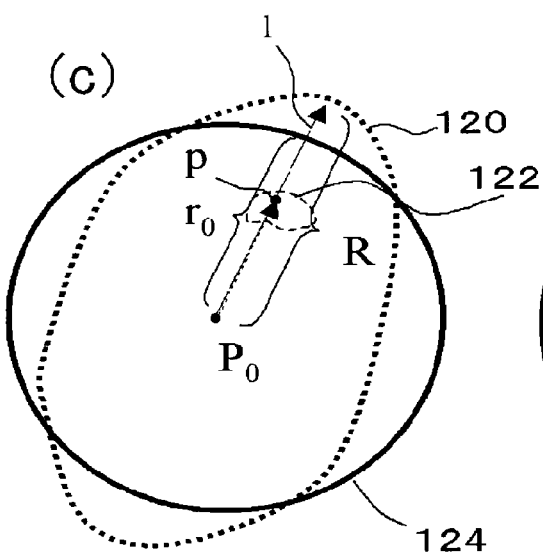
(d) 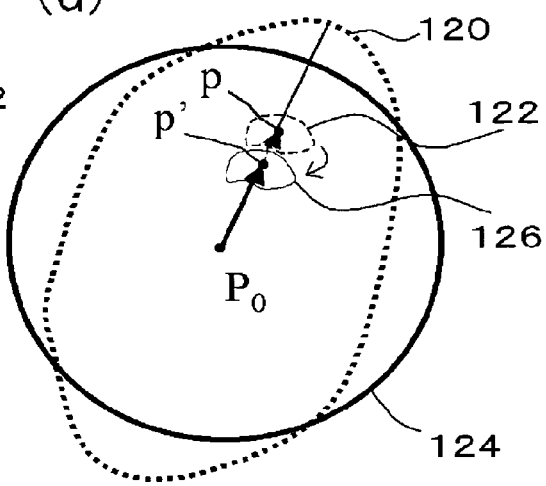

US 7,840,357 B2

METHOD OF EVALUATING CHROMOSOME STATE AND EVALUATION SYSTEM

This application claims priority from PCT Application No. PCT/JP2004/010852 filed Jul. 29, 2004 and from Japanese Application No 2003-282122 filed Jul. 29, 2003, which applications are incorporated herein by reference.

TECHNICAL FIELD

The present invention relates to a method and a system for evaluating a state of a cell and of a chromosome contained in a cell based on a positioning state of a chromosome territory in an interphase of a cell cycle.

BACKGROUND ART

Conventionally, chromosome morphology can only be observed in a condensed state of a mitotic phase of a cell cycle. However, owing to recent developments in visualization techniques (3D-FISH, confocal laser microscopy), it has become possible to observe the positioning and morphology of chromosomes in an interphase of a cell cycle. In accordance with such visualization techniques it has become clear that, within the nucleus of a cell in an interphase, individual chromosomes are present separately in regions that are not intermingled with each other (Non-patent Publication 1, Non-patent Publication 2). Hereinafter, the region occupied by an individual chromosome within the nucleus is called a chromosome territory.

[Non-patent Publication 1]
T. Cremer, C. Cremer, CHROMOSOME TERRITORIES NUCLEAR ARCHITECTURE AND VENE REGULATION IN MAMMALIAN CELLS, NATURE REVIEWS/GENETICS, vol. 2, pp. 292-301, 2001

[Non-patent Publication 2]
Hideyuki Tanabe, 'Chromosome territory: recent advancement of studies on interphase chromosome intranuclear positioning in relation to nuclear architecture', Environ. Mutagen Res., 25, pp. 11 to 22, 2003

[Patent Publication 1]
Japanese Laid-open Patent Publication No. 2001-92980

DISCLOSURE OF THE INVENTION

It is thought that a change from a normal cell to a tumor cell and a change from a benign tumor cell to a malignant tumor cell are caused by gene mutation or gene translocation. In Non-patent Publication 2, the concept of the probability of spatially adjacent chromosome territories undergoing translocation being higher than that of those positioned far from each other is described.

From the above, it can be expected that changes in a cell could be evaluated by examining the spatial positioning of chromosome territories. However, there has conventionally been no technique provided for quantitatively analyzing the spatial positioning of chromosome territories and evaluating changes in a cell.

The inventors of the present application have devised the invention below for the purpose of evaluating a cell state by examining the positioning state of a chromosome territory in an interphase of a cell cycle, and using, based on the evaluation result, the cell state as an index for diagnosis of a disease such as cancer.

According to the present invention, there is provided a method of evaluating a cell state based on information of an image taken of a cell containing a chromosome territory, the method including extracting the chromosome territory from the image, standardizing a positioning state of the chromosome territory and then quantifying the positioning state, and evaluating a cell state based on the quantified positioning state of the chromosome territory.

Here, the positioning state may include at least one of the relative position of the chromosome territory in the cell nucleus, the direction of the principal axis of the chromosome territory, and the spread of the chromosome territory. Furthermore, the standardization referred to is processing in order to quantify the forms of chromosome regions in a plurality of cells using a unified index. By carrying out such processing, quantification can be carried out for a plurality of cells using a unified index.

The cell state evaluation referred to here means evaluating the state of a chromosome contained in the cell, and evaluating changes occurring in the cell, the expectancy of an abnormality in the morphology of the cell, chromosome translocation, and the possibility of being affected by a disease such as cancer based on changes occurring in the cell. In accordance with the evaluation method of the present invention, since the form of a chromosome territory can be quantified, it can be expected that, based on the quantification result, an abnormality in the morphology of the cell or the existence of a disease will be detected at an early stage.

The image taken of a cell may contain a plurality of images obtained by imaging the cell nucleus at nuclear cross sections, and the chromosome territory extraction may include extracting a chromosome territory image in three dimensions by extracting a chromosome territory from each of the plurality of images and combining these images.

In the evaluation method of the present invention, in the chromosome territory extraction, in addition to extracting a cell nucleus a chromosome territory contained in the nucleus may be extracted, and the positioning state quantification may include standardizing the form of a nucleus and transforming the coordinates of a chromosome territory based on a change in form between the nucleus before standardization and the nucleus after standardization. The change in form of the nucleus referred to here may include a change in the shape and a change in the size. The chromosome territory coordinate transformation may be carried out by coordinate transformation based on a relative relationship between the nucleus before standardization and the chromosome territory and a relative relationship between the nucleus after standardization and the chromosome territory.

The evaluation method of the present invention may further include statistically processing the quantification results of a positioning state of a plurality of cells, and in the cell state evaluation, a state of a single cell may be evaluated based on a result of quantifying a positioning state of the single cell and a result of statistical processing.

In the evaluation method of the present invention, the statistical processing may include calculating a standard value of the quantification result of the positioning state based on the result of quantifying a positioning state of a plurality of cells, and in evaluating a cell state, a state of a single cell may be evaluated based on a result of quantifying a positioning state of the single cell and the standard value.

In the evaluation method of the present invention, the standard value calculation may include calculating an average value of the result of quantifying the positioning of chromosomes of a plurality of cells.

According to the present invention, there is provided a method of evaluating a cell state based on information of an image taken of a cell containing a chromosome territory, the method including extracting a plurality of chromosome territories from the image, quantifying a positioning state of the plurality of chromosome territories, statistically processing the result of quantifying the positioning state of a plurality of cells, and evaluating a state of a single cell based on a result of quantifying a positioning state of the single cell and a result of statistical processing.

In this way, by comparing the result of quantifying the positioning state of a chromosome territory of a single cell with the result of statistical processing, the degree of abnormality of the single cell can be evaluated. Furthermore, in accordance with the evaluation method of the present invention, since the form of a chromosome territory can be quantified, it can be expected that, based on the quantification result, an abnormality in the morphology of the cell or the existence of a disease will be detected at an early stage.

In the evaluation method of the present invention, the positioning state may include at least one of a distance between the plurality of chromosome territories and a positioning direction of the plurality of chromosome territories.

In the evaluation method of the present invention, the quantification may include calculating a distance between the plurality of chromosome territories.

In the evaluation method of the present invention, the distance calculation may include calculating a center of gravity of each of the plurality of chromosome territories and calculating a distance between the centers of gravity.

Furthermore, in the evaluation method of the present invention, the distance calculation may be carried out as follows.

In the evaluation method of the present invention, the distance calculation may include calculating a distance between chromosome territories using the Mahalanobis distance.

In the evaluation method of the present invention, the distance calculation may include calculating a distance between boundaries of chromosome territories. Here, as the distance between boundaries of chromosome territories, the shortest distance between the boundaries may be used.

In the evaluation method of the present invention, the distance calculation may include approximating the forms of the plurality of chromosome territories using a normal distribution, calculating an average value of the normal distribution of each of the chromosome territories, and calculating a distance between the average values.

In the evaluation method of the present invention, the distance calculation may include detecting a skeleton line of each of the plurality of chromosome territories, calculating a center of gravity of the skeleton line, and calculating a distance between the centers of gravity.

In the evaluation method of the present invention, the quantification may include quantifying the positioning direction of the plurality of chromosome territories.

In the evaluation method of the present invention, the quantification of the positioning direction may include detecting a principal axis of each of the plurality of chromosome territories and calculating an angle of the principal axis.

In the evaluation method of the present invention, the detection of a principal axis may include approximating the forms of the plurality of chromosome territories using a normal distribution, calculating an average value of the normal variance and a covariance matrix of each of the chromosome territories based on the approximated forms of the chromosome territories, and subjecting the covariance matrix to eigenvalue decomposition.

According to the present invention, there is provided a method of evaluating a cell state based on information of an image taken of a cell containing a chromosome territory, the method including extracting each of a cell nucleus and a chromosome territory from the image, quantifying a positioning state of the nucleus and the chromosome territory, statistically processing the result of quantifying the positioning state of a plurality of cells, and evaluating a state of a single cell based on a result of quantifying a positioning state of the single cell and a result of statistical processing.

In the evaluation method of the present invention, the quantification may include calculating a distance between a reference point within the nucleus and the chromosome territory. The reference point within the nucleus referred to here may be, for example, a nuclear wall or a center of gravity.

In the evaluation method of the present invention, the quantification of a positioning state of the chromosome territory may further include standardizing a positioning state of the chromosome territory, and the positioning state quantification may be carried out after standardizing a positioning state of the chromosome territory.

In the evaluation method of the present invention, the statistical processing may include calculating a standard value of a quantification result of a positioning state based on a result of quantifying a positioning state of the plurality of cells, and in the cell state evaluation, a state of a single cell may be evaluated based on a result of quantifying the positioning state of the single cell and the standard value.

In the evaluation method of the present invention, the calculation of a standard value may include calculating an average value of results of quantifying a positioning state of a plurality of cells.

According to the present invention, there is provided a method of evaluating a cell state based on information of an image taken of a cell containing a chromosome territory, the method including extracting each of a cell nucleus and a plurality of chromosome territories from the image, standardizing the form of the nucleus, transforming the coordinates of the chromosome territories based on a fixed criterion determined according to a change in form between the nucleus before standardization and the nucleus after standardization, calculating a center of gravity of each of the transformed chromosome territories, calculating a distance between the centers of gravity of the plurality of chromosome territories, statistically processing the obtained distance between the centers of gravity with respect to a plurality of cells, and evaluating a state of a single cell based on the distance between the centers of gravity of the single cell and a result of statistical processing.

In the evaluation method of the present invention, the evaluation of a cell state may include quantifying, using the t-test, a difference between a result of quantifying a positioning state of the single cell and a result of statistical processing.

In the evaluation method of the present invention, the evaluation of a cell state includes quantifying, using the chi-square test, a difference between a result of quantifying a positioning state of the single cell and a result of statistical processing.

According to the present invention, there is provided a system for evaluating a cell state based on information of an image taken of a cell containing a chromosome territory, the system including an extraction processing unit which extracts a chromosome territory from the image, a quantification processing unit which quantifies a positioning state of the extracted chromosome territory, a memory unit which stores a result of quantifying the positioning state, a statistical processing unit which statistically processes results of quantifying a positioning state of a plurality of cells, and an evaluating unit which evaluates a state of a single cell based on a result of quantifying a positioning state of the single cell and a result of statistical processing.

In the evaluation system of the present invention, the quantification processing unit may standardize the positioning state of the chromosome territory extracted from the image, and quantify said positioning state after standardizing the positioning state of the chromosome territory.

In the evaluation system of the present invention, the extraction processing unit may extract a cell nucleus as well as extract a chromosome territory contained in said nucleus, and the quantification processing unit may standardize the form of the nucleus and transform the coordinates of the chromosome territory based on a change in form between the nucleus before standardization and the nucleus after standardization.

According to the present invention, there is provided a program which, in a computer, evaluates a cell state based on information of an image taken of a cell containing a chromosome territory, the program making the computer function as a unit which extracts a chromosome territory from the image, a unit which standardizes a positioning state of the chromosome territory and then quantifies the positioning state, and a unit which evaluates a cell state based on the quantified positioning state of the chromosome territory.

According to the present invention, there is provided a program which, in a computer, evaluates a cell state based on information of an image taken of a cell containing a chromosome territory, the program making the computer function as an extracting unit which extracts a chromosome territory from the image, a quantifying unit which quantifies a positioning state of the extracted chromosome territory, a memory unit which stores a result of quantifying the positioning state, a statistical processing unit which statistically processes a result of quantifying a positioning state of a plurality of cells, and an evaluating unit which evaluates a state of a single cell based on a result of quantifying a positioning state of the single cell and a result of statistical processing.

In the evaluation method of the present invention, the image may be formed from a plurality of pixels each having an attribute value, and the chromosome territory extraction may include classifying an image into a plurality of classes, and extracting any of the classes from the image as a region representing a chromosome territory. The classifying here includes setting an initial value for an attribute parameter indicating an attribute value of each class and for a mixture ratio of the classes, calculating based on the attribute parameter and the mixture ratio a class membership probability of each of the plurality of pixels being classified into each of the classes, calculating an evaluation function which represents a goodness of estimation based on the membership probability and a mixture probability distribution defined by the attribute parameter and the mixture ratio and determining whether or not the evaluation function satisfies predetermined conditions, updating the attribute parameter and the mixture ratio when the evaluation function does not satisfy the predetermined conditions, and classifying the plurality of pixels into any of the plurality of classes based on the attribute parameter and the mixture ratio when the evaluation function satisfies the predetermined conditions.

By use of this method, a chromosome territory can be extracted from an image with high accuracy. By extracting a chromosome territory with high accuracy, variation in the quantification result for the chromosome territory can be reduced, and evaluation of a cell state can be improved.

In the evaluation method of the present invention, the class membership probability calculation may include decomposing the plurality of pixels into a plurality of partial spaces according to the attribute value of the pixels, calculating a coarse-grained empirical probability distribution representing the proportion of pixels contained in a partial space, and calculating based on the attribute parameter and the mixture ratio a coarse-grained class membership probability of each of the partial spaces being classified into each of the classes; the evaluation function calculation may include calculating a coarse-grained mixture probability distribution by averaging, within a partial space, mixture probability distributions defined by the attribute parameter and the mixture ratio; and an evaluation function may be calculated based on the coarse-grained empirical probability distribution, the coarse-grained mixture probability distribution, and the coarse-grained class membership probability.

By carrying out such coarse-graining, the processing time can be greatly shortened. The coarse-graining is explained in detail below.

As the method of extracting a chromosome territory of the present invention, the following methods are also effective.

(1) An extraction method involving, with respect to an image containing an extraction target image, classifying pixels in the image into a plurality of classes and extracting a desired region, the method including:

a first step of decomposing a data space formed from all the attribute values that each pixel of the image can take into partial spaces at a given resolution, and forming a coarse-grained data space that holds sets of pixels taking attribute values in each of said partial spaces, the average of attribute values of said pixels, and the number of said pixels, a second step of calculating a coarse-grained empirical probability distribution in the coarse-grained data space by dividing the number of pixels of each partial space by the total number of pixels contained in the image, a third step of initializing a class mixture ratio and a class parameter that defines the attribute of each class, a fourth step of calculating a conditional probability distribution under a class designated by the class parameter, and calculating a coarse-grained conditional probability distribution by averaging the conditional probability distributions within each partial space, a fifth step of calculating a class membership probability, which is a probability of each pixel belonging to each class, by multiplying the class mixture ratio by the coarse-grained conditional probability distribution, a sixth step of updating the class parameter and the class mixture ratio, a seventh step of calculating an evaluation function using the coarse-grained conditional probability distribution, an eighth step of examining whether or not the evaluation function satisfies given completion conditions, and a ninth step of determining a class to which each pixel belongs based on the class parameter, the class mixture ratio, and the class membership probability when the evaluation function satisfies the given completion conditions, and extracting a desired region.

Here, as the evaluation function, a coarse-grained log likelihood may be used. In this process, in the sixth step, the class parameter and the class mixture ratio may be updated so as to increase the evaluation function. Furthermore, in the third step, a number of classes may be initialized. A number of classes may also be set at a given value beforehand. Moreover, in the extraction method of the present invention, the fourth, fifth, sixth, seventh, and eighth steps may be repeated until the evaluation function satisfies the given conditions in the eighth step.

(2) The extraction method as set forth in (1) above, wherein when calculating a coarse-grained conditional probability distribution in the fourth step, an average value of attribute values of pixels contained in each partial space is calculated, and a coarse-grained conditional probability distribution in each partial space is calculated using the average value.

(3) The extraction method as set forth in (1) or (2) above, wherein the method further includes a tenth step of examining whether the coarse-graining resolution is the original resolution, and an eleventh step of restoring the resolution of a partial space to the original resolution, after the resolution of the partial space is restored to the original resolution, the first step to the eighth step being carried out, and in the third step the class parameter and the class mixture ratio in the ninth step being used as initial values.

(4) The extraction method as set forth in any one of (1) to (3) above, wherein in the ninth step a number of pixels belonging to each class is calculated by multiplying a corresponding class mixture ratio when the evaluation function satisfies the given completion conditions by the total number of pixels contained in the image, and a pixel belonging to each class is determined by selecting pixels at the above-mentioned number of pixels in order from the highest class membership probability.

(5) The extraction method as set forth in any one of (1) to (4) above, wherein in the seventh step the AIC is used as the evaluation function, and in the sixth step the parameter is changed so as to decrease the evaluation function.

(6) The extraction method as set forth in any one of (1) to (4) above, wherein in the seventh step the MDL (Minimum Description Length) is used as the evaluation function, and in the sixth step the parameter is changed so as to decrease the evaluation function.

(7) The extraction method as set forth in any one of (1) to (4) above, wherein in the seventh step the Structural Risk is used as the evaluation function, and in the sixth step the parameter is changed so as to decrease the evaluation function.

(8) The extraction method as set forth in any one of (1) to (7) above, wherein the third step includes setting a neighbor radius which defines whether or not partial spaces are in the neighborhood of each other, and setting a number of classes (step B1), setting a representative value of each partial space for each of the partial spaces (step B2), setting a set of classification target partial spaces (step B3), selecting, among the set of classification target partial spaces, a partial space having the highest coarse-grained empirical probability (step B4), selecting, as a neighbor set, all partial spaces having a representative value whose distance from the representative value of the partial space having the highest coarse-grained empirical probability is within the neighbor radius (step B5), examining whether or not the shortest distance between the representative value of the partial spaces contained in an already classified class and the representative value of the partial spaces contained in the neighbor set is larger than the neighbor radius (step B6), if in step B6 the shortest distance between the representative value of the partial spaces contained in the already classified class and the representative value of the partial spaces contained in the neighbor set is larger than the neighbor radius, making the neighbor set a new class and deleting the neighbor set from the classification target partial spaces (step B7), if in step B6 the shortest distance between the representative value of the partial spaces contained in the already classified class and the representative value of the partial spaces contained in the neighbor set is smaller than the neighbor radius, adding the neighbor set to the already classified class and deleting the neighbor set from the classification target partial spaces (step B8), examining whether or not the classification target partial spaces are an empty set (step B9), if in step B9 the classification target partial spaces are not an empty set, repeating step B4 and thereafter, if in step B9 the classification target partial spaces are an empty set, examining whether or not the number of classified classes is equal to or greater than a given number (step B10), if in step B10 the number of classified classes is less than the given number, reducing the neighbor radius (step B11), and repeating step B3 and thereafter, and if in step B10 the classification target partial spaces are an empty set and the number of already classified classes is greater than the given number, calculating a class parameter within each class, making this an initial value of the class parameter, and making the ratio of the number of partial spaces contained in each class an initial value of the class mixture ratio (step B12).

In steps B7 and B8, if the shortest distance between the representative value of the partial spaces contained in the already classified class and the representative value of the partial spaces contained in the neighbor set is equal to the neighbor radius, either processing may be carried out.

(9) An extraction device which, with respect to an image containing an extraction target image, classifies pixels in the image into a plurality of classes and extracts a desired region, the device including, an inputting device which reads in an image, a region coarse-graining device which decomposes a data space formed from all the attribute values that each pixel of the image can take into partial spaces at a given resolution, holds sets of pixels taking attribute values in each of said partial spaces, the average of the attribute values of said pixels, and the number of said pixels, and forms a coarse-grained data space, a coarse-grained empirical probability distribution calculating device which calculates a coarse-grained empirical probability distribution in a coarse-grained data space by dividing the number of pixels of each partial space by the total number of pixels contained in the image, a coarse-grained conditional probability distribution device which calculates a coarse-grained conditional probability distribution by initializing a class parameter defining the attribute of each class and a class mixture ratio, calculating from the class parameter defining the attribute of each class a conditional probability distribution under a designated class, and averaging conditional probability distributions under designated classes for each partial space, a class membership probability calculating device which calculates from the coarse-grained conditional probability distribution a class membership probability of each pixel of the image belonging to each class, a parameter updating device which updates the class parameter and the class mixture ratio, an evaluation function calculating device which calculates an evaluation function using a coarse-grained conditional probability distribution, a region extraction device which extracts a desired region by examining whether or not the evaluation function satisfies given completion conditions, and determining a class to which each pixel belongs based on the class parameter, the class mixture ratio, and the class membership probability when the evaluation function satisfies the given completion conditions, and an outputting device which outputs an extracted region.

Here, the evaluation function calculating device may employ as the evaluation function the coarse-grained log likelihood, the AIC, the MDL, or the Structural Risk. When the evaluation function calculating device employs as the evaluation function the coarse-grained log likelihood, the parameter updating device may update the class parameter and the class mixture ratio so as to increase the evaluation function. Furthermore, when the evaluation function calculating device employs as the evaluation function the AIC, the MDL, or the Structural Risk, the parameter updating device may update the class parameter and the class mixture ratio so as to decrease the evaluation function.

(10) The extraction device as set forth in (9) above, wherein the device further includes a resolution restoring device which examines whether the coarse graining resolution is the original resolution after it has been confirmed that the evaluation function satisfies the given completion conditions, and restores the resolution of the data space to the original resolution.

The operation of the extraction method and the extraction device as set forth in (1) to (10) above are explained below.

In the extraction method as set forth in (1) above, the attribute value of each pixel forming an image is considered as a random variable, and a desired region is extracted based on the probability distribution of an estimated pixel value. Here, as the attribute value, for example, a luminance value may be used for a monochrome image, and an intensity, et cetera, of red (R), green (G), and blue (B) color elements may be used for a color image.

Here, in order to extract a desired region, the pixels are classified into a plurality of groups having similar attributes, based on the attribute value of each pixel. In the present specification, a set of pixels having similar attributes is called a class. Each class is characterized by an average value, variance, et cetera, of attribute values belonging to the class. Hereinafter, these characteristics of the class are called 'class parameters' of the class and are expressed as $\phi_i$ (i=1,,,k). Here, k is a number of classes. Here, the probability of a $j^{th}$ pixel taking an attribute value of $x_j$ can be expressed by the following mixture distribution.

[Eq. 1]

$$p(x_j) = \sum_{i=1}^{k} w_i f(x_j | \phi_i) \quad (1)$$

Here, f ($x_j|\phi_i$) is a conditional probability distribution assuming that data is generated from the $i^{th}$ class, $w_i$ is a mixture ratio of each class, and $$\sum_{i=1}^{k} \omega_i = 1 \quad [\text{Eq. 2}]$$

is satisfied.

In the case in which the image is a monochrome image, $x_j$ is expressed as an integer value of 0 to 255, et cetera. Furthermore, in the case in which the image is a color image, $x_j$ is expressed as a three-dimensional vector ($x_{j1}$, $x_{j2}$, $x_{j3}$) whose components are values of RGB color elements. Here, each $x_{j1}$ (l=1, 2, 3) takes an integer value of, for example, 0 to 255.

The mixture ratio $w_i$ represents an area ratio (in the case of a two-dimensional region) or a volume ratio (in the case of a three-dimensional region) of regions belonging to different classes. It is assumed that, for example, there is a monochrome image formed from two regions, that is, a bright image region (called Class 1) characterized by having an average luminance of 200 and a luminance standard deviation of 20, and a dark region (called Class 2) characterized by having an average luminance of 50 and a luminance standard deviation of 10. It is also assumed that the bright region occupies 70% of the image area and the dark region occupies 30% thereof. In this case, the number of classes is k=2, the class parameters are $\phi_1$=(200, 20) and $\phi_2$=(50, 10), and the mixture distribution of this image can be expressed as follows.

[Eq. 3]

$$p(x_j)=0.7(x_j|200, 20)+0.3(x_j|50, 10) \quad (2)$$

Hereinafter, the class mixture ratio $w_i$ and the class parameter $\phi_i$ are together expressed by $\theta_i$. Hereinafter, when simply using 'parameter', it means $\theta_i$.

In the extraction method as set forth in (1) above, a parameter that maximizes an average log likelihood defined as below is estimated,

[Eq. 4]

$$L = \frac{1}{n}\sum_{j=1}^{n} \log p(x_j) = \frac{1}{n}\sum_{j=1}^{n} \log\left[\sum_{i=1}^{k} w_i f(x_j | \phi_i)\right] \quad (3)$$

and region extraction is carried out using the estimated parameter information. Here, n denotes a number of pixels contained in the image. Such a statistical method is called the maximum likelihood method. However, it is in general difficult to estimate a parameter that maximizes the average log likelihood. Therefore, instead of the average log likelihood, an expectation value Q of a complete log likelihood represented by the following amount may be used for estimation of the parameter.

[Eq. 5]

$$Q = \frac{1}{n}\sum_{j=1}^{n}\sum_{i=1}^{k} \pi_{ij}\log[w_i f(x_j | \phi_i)] \quad (4)$$

Here,

[Eq. 6]

-continued $$\pi_{ij} = \frac{w_i f(x_j \mid \phi_i)}{\sum_{l=1}^{k} w_l f(x_j \mid \phi_l)} \quad (5)$$

is a probability of the $j^{th}$ pixel belonging to the $i^{th}$ class. In the present invention, this is called the class membership probability. It has been mathematically proven that if the parameter is updated so as to increase Q, the above-mentioned average log likelihood L is also certain to increase (for example, A. P. Dempster, N. M. Laird, and D. B. Rubin, Maximum Likelihood From Incomplete Data via The EM Algorithm, J. Roy. Stat. Soc., vol. 30, pp. 205-248, 1977 (hereinafter, called Non-patent Publication 3)).

A procedure which estimates a parameter and actually extracts a region using the estimated parameter in the present invention is now explained.

First, a class membership probability represented by Equation (5) is determined by starting with appropriate initial parameters. Subsequently, the parameters w and φ are updated so as to increase Q, and Q is calculated anew. This procedure is repeated until Q finally stops increasing. A region is extracted using the parameters w and φ when Q finally stops increasing. Among k classes, for example, in order to extract a pixel belonging to the $i^{th}$ class, a value of the membership probability of each pixel belonging to the $i^{th}$ class is first examined. Subsequently, pixels having a probability value of equal to or greater than a certain value are classified as belonging to that class. When all the pixels are classified into corresponding classes, a class having a desired attribute is selected from the k classes, and by extracting the pixels belonging to that class from the image a desired region can automatically be extracted.

In the present invention, in order to carry out the maximization of Q at high speed, the coarse-grained probability distribution is introduced. The coarse-grained probability distribution is formed by decomposing a space containing all the values that the data can take (hereinafter, called a data space) into N partial spaces that do not intersect each other, and assigning a probability to each partial space.

Specifically, a coarse-grained conditional probability distribution in the $j^{th}$ partial space is defined by

[Eq. 7]

$$\tilde{f}_j(\phi_i) = \frac{1}{m(A_j)} \int_{A_j} f(x \mid \phi_i) dx \quad (6)$$

and the coarse-grained conditional probability distribution is defined as below.

[Eq. 8]

$$\tilde{f}(x \mid \phi_i) = \sum_{j=1}^{N} \tilde{f}_j(\phi_i) I_{A_j}(x) \quad (7)$$

Here, $A_j$ denotes the $j^{th}$ partial space. When D is the entire data space,

[Eq. 9]

$$D = \cup_j A_j, A_i \cap A_j = 0 (i \neq j) \quad (8)$$

are satisfied. Furthermore, $I_A(x)$ is an indicator function that is 1 when the data value is contained in the partial space A and otherwise is 0, and

[Eq. 10]

$$m(A) = \int_A dx$$

is a measure of A (the area of A when the data space is two-dimensional and the volume when it is three-dimensional).

By use of the coarse-grained conditional probability distribution thus defined, Q shown in Equation (4) above can be rewritten as follows.

[Eq. 11]

$$\tilde{Q} = \sum_{i=1}^{k} \tilde{q}_j \tilde{\pi}_{ij} \log[w_i \tilde{f}_j(\phi_i)] \quad (9)$$

Here,

[Eq. 12]

$$\tilde{q}_j = \frac{1}{n} \sum_{l=1}^{n} I_{A_j}(x_l) \quad (10)$$

is a coarse-grained empirical probability distribution, and

[Eq. 13]

$$\tilde{\pi}_{ij} = \frac{w_i \tilde{f}_j(\phi_i)}{\sum_{i=1}^{k} w_i \tilde{f}_j(\phi_i)} \quad (11)$$

is a coarse-grained class membership probability. By maximizing the coarse-grained complete log likelihood given by Equation (9), the coarse-grained average log likelihood below can be maximized.

[Eq. 14]

$$\tilde{L} = \sum_{j=1}^{N} \tilde{q}_j \log\left[\sum_{i=1}^{k} w_i \tilde{f}_j(\phi_i)\right] \quad (12)$$

Compared with the original Q, the Q given by Equation (4) is the sum with respect to the entire data, but the coarse-grained complete log likelihood given by Equation (9) is the sum only with respect to the partial spaces. As hereinafter described, by carrying out such coarse-graining, the amount of calculation can be greatly reduced. For example, in the case of a 512×512 pixel image, if Equation (4) is used, it is necessary to take a sum of more than 260,000 data, but if the coarse-grained distribution of the present invention is used, it can be reduced down to a sum of about 1,000 with respect to the partial spaces, and a high speed estimation can be carried out.

Furthermore, in the extraction method as set forth in (2) above, the coarse-grained probability value of each partial space is approximated by a probability value at an average value of the data contained in the partial space.

[Eq. 15]

$$\tilde{f}_j(\phi_i) = f(\tilde{T}_j | \phi_i) \quad (13)$$

Here,

[Eq. 16]

$$\tilde{x}_j = \frac{1}{\sum_{l=1}^{n} I_{A_j}(x_l)} \sum_{l=1}^{n} x_l I_{A_j}(x_l) \quad (14)$$

is an average value of the data contained in the $j^{th}$ partial space $A_j$. By this approximation, integration (or summation) within a partial space can be omitted, and the amount of calculation can be further reduced.

Furthermore, it is also possible to carry out estimation again at the original resolution using, as an initial value, a parameter estimated using the coarse-grained probability distribution. In this case, since substantially the most appropriate parameter has been obtained by use of the coarse-grained probability distribution, compared with a case in which estimation is carried out from the beginning at the original resolution, the number of times of sequential updating of the parameter can be greatly reduced, and a highly accurate estimation can therefore be carried out at high speed.

Furthermore, when a region is extracted, it is also possible to carry out estimation of the number of pixels belonging to the $i^{th}$ region by multiplying the estimated mixture ratio $w_i$ by the total number of pixels. The top $n_i$ pixels having the highest region membership probability are extracted as the pixels belonging to this region. By this method, a threshold value, which is the value of the probability value up to which it is considered to belong to the region, can automatically be determined. In the present invention, in order to quantify the form of the chromosome territory and evaluate a cell state based on the quantification result, it is necessary to extract a chromosome territory from an image with good accuracy. By automatically determining a threshold value as described above, a chromosome territory can be extracted with good accuracy.

Moreover, as the evaluation function, it is also possible to use each of the AIC, the MDL, and the Structural Risk and select a model that gives the smallest value. When the AIC, the MDL, or the Structural Risk is used as the evaluation function, if an excessive number of parameters are used, since the value of the evaluation function increases, it is possible to estimate an optimum number of parameters. This enables an appropriate number of regions, that is, how many types of regions an image is formed from, to be estimated.

As hereinbefore described, when a chromosome territory is extracted from an image, if coarse-graining is carried out, compared with a case in which no coarse-graining is carried out, since the amount of calculation of the conditional probability distribution or the class membership probability can be greatly reduced, the time taken for extracting a chromosome territory can be greatly shortened. Although the class parameter estimated as a result of such processing has poorer accuracy compared with a case in which no coarse-graining is carried out, since extraction of a region is carried out based on the class membership probability calculated from the class parameter in the extraction method of the present invention, it is possible to extract a region with good accuracy without being influenced by errors from coarse-graining.

Constitutions of the present invention are explained above, and any combination of these constitutions is also effective as an embodiment of the present invention. Furthermore, conversion of expression of the present invention into another category is also effective as an embodiment of the present invention.

In accordance with the evaluation method of the present invention, a positioning state of a chromosome territory in an interphase of a cell cycle can be quantified. This enables a cell state to be evaluated statistically.

BRIEF DESCRIPTION OF THE DRAWINGS

The above-mentioned object, other objects, features, and advantages will become more apparent from a preferred embodiment described below and the following drawings attached thereto.

[FIG. 11] A schematic diagram showing a manner in which coordinates of a chromosome territory are transformed.

BEST MODE FOR CARRYING OUT THE INVENTION

Figure 1:
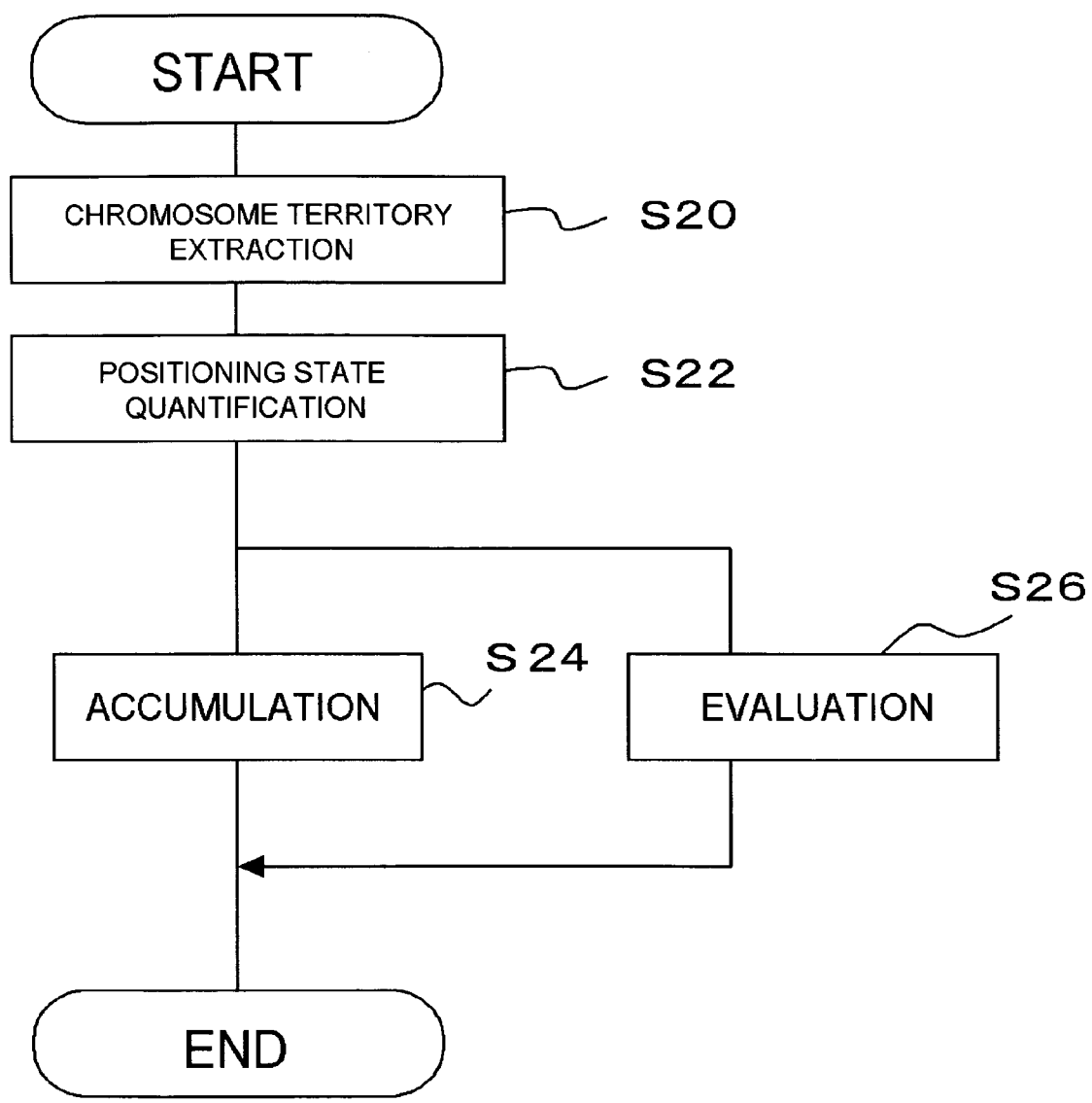
[FIG. 1] A flowchart showing a processing procedure of a cell state evaluation method in an embodiment of the present invention.

FIG. 1 is a flowchart showing a processing procedure of the method of evaluating a cell state in an embodiment of the present invention.

First, from an image taken of a cell containing a chromosome territory, a chromosome territory image is extracted (S20). In the present embodiment, images of the cell nucleus and a plurality of chromosome territories are each extracted from a three-dimensional image. Subsequently, a positioning state of the chromosome territory is quantified (S22). The result of quantifying the positioning state of the chromosome territory is stored. For a plurality of samples, processing of step 20 and processing of step 22 are carried out, and quantification results for the plurality of samples are accumulated (S24). Furthermore, a particular sample is subjected to processing of step 20 and processing of step 22, the quantification result is compared with the quantification results of the plurality of samples accumulated in step 24, and a cell state of the particular sample is thus evaluated (S26).

Figure 2:
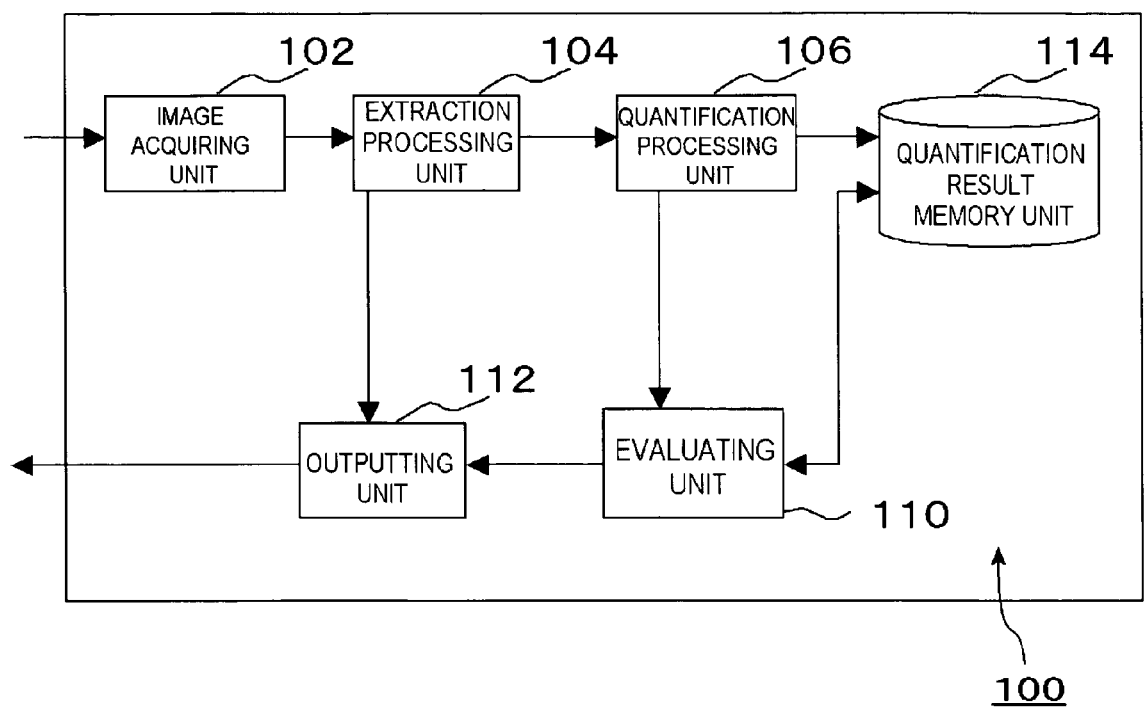
[FIG. 2] A block diagram showing an evaluation device of the present embodiment carrying out the processing procedure shown in FIG. 1.

FIG. 2 is a block diagram showing an evaluation device of the present embodiment carrying out the processing procedure shown in FIG. 1.

An evaluation device 100 includes an image acquiring unit 102, an extraction processing unit 104, a quantification processing unit 106, an evaluating unit 110, an outputting unit 112, and a quantification result memory unit 114. The image acquiring unit 102 acquires a three-dimensional image taken of a cell containing a chromosome territory. The extraction processing unit 104 extracts a chromosome territory image from the three-dimensional image. The quantification processing unit 106 quantifies a positioning state of the chromosome territory. The quantification processing unit 106 stores the quantification result in the quantification result memory unit 114. The evaluating unit 110 compares the quantification result of a particular sample with the quantification results of a plurality of samples stored in the quantification result memory unit 114, and evaluates a cell state of the particular sample. The outputting unit 112 outputs the result of extraction of a chromosome region image by the extraction processing unit 104, or the result of evaluation of a cell state by the evaluating unit 110. The outputting unit 112 may be formed from, for example, a display device or a printer.

Each procedure shown in FIG. 1 is explained below.

(Extraction of Chromosome Territory (S20))

A three-dimensional image of a cell containing a chromosome territory may be obtained using the 3D-FISH (Fluorescent in situ hybridization) method. The image acquiring unit 102 may be formed from an image scanner, a digital camera, et cetera, and an image obtained using the 3D-FISH method may be read in. Furthermore, the image acquiring unit 102 may be formed from a computer connected to a biological microscope, and it is possible to directly input an image via a network.

The procedure of the 3D-FISH method is explained below.

Cells are cultured on a cover glass, and PFA (Paraformaldehyde) is used for fixing cells. Subsequently, a treatment with a TritonX100 solution is carried out. Freezing and thawing is then repeated several times using liquid nitrogen. Following this, a hydrochloric acid treatment and a pepsin treatment are carried out. This allows cell membrane and nuclear membrane to be partially destroyed, thus enhancing the penetrability for a probe. Furthermore, the above-mentioned treatments enable parts other than the nucleus to be removed to some extent.

Subsequently, cells are fixed again, and DNA is denatured at about 75° C. As a result, double strand DNA is converted into single strands. Labeled probes (DNA fragments that are complementary to a target chromosome territory and the nucleus) are added thereto, and by carrying out a reaction at about 37° C., the probes are complementarily bonded to the target chromosome territory and the nucleus. The probes are provided with dyes that generate colors at different wavelengths according to the type of target chromosome territory and the nucleus. By irradiating with a wavelength at which a particular dye generates a color, it is possible to make only that dye generate a color distinctively.

By irradiating a sample prepared as above with a particular wavelength using a confocal laser microscope, an image containing a target chromosome territory is obtained. By superimposing images containing chromosome territories and an image containing the nucleus, an image containing a plurality of chromosome territories may be obtained.

Processing to which the image thus obtained is subjected is explained below. Hereinafter, when simply 'chromosome territory' and 'nucleus' are referred to, they do not mean the chromosome territory or the nucleus themselves, but mean a chromosome territory image and a nucleus image on an image.

The extraction processing unit 104 shown in FIG. 2 carries out image processing involving extracting a chromosome territory from an image obtained as above. In the present embodiment, the extraction processing unit 104 extracts images of the chromosome territory and the nucleus from the image by classifying an image containing a plurality of pixels into a plurality of classes, and assigning each of the plurality of classes to the chromosome territory and the nucleus. In this process, the extraction processing unit 104 assumes that there are a plurality of luminance sources having different luminances in each pixel, and carries out a classification based on the probability of each luminance source belonging to that pixel and the mixture ratio of the luminance sources in the image.

Such a technique is described in, for example, Japanese Laid-open Patent Publication No. 2001-92980 (hereinafter called Patent Publication 1). Patent Publication 1 describes a technique in which, from image data, an expectation value of a region membership probability of each pixel on an image belonging to each of the regions is calculated, an evaluation function is calculated based on a mixture probability distribution determined from the region membership probability and a region parameter, each of the regions is separated based on the region membership probability in the above process, and a contour is extracted based on the separated regions. In the present embodiment, the concept of coarse-graining is further introduced to this technique, and an optimum parameter is obtained at high speed.

Figure 3:
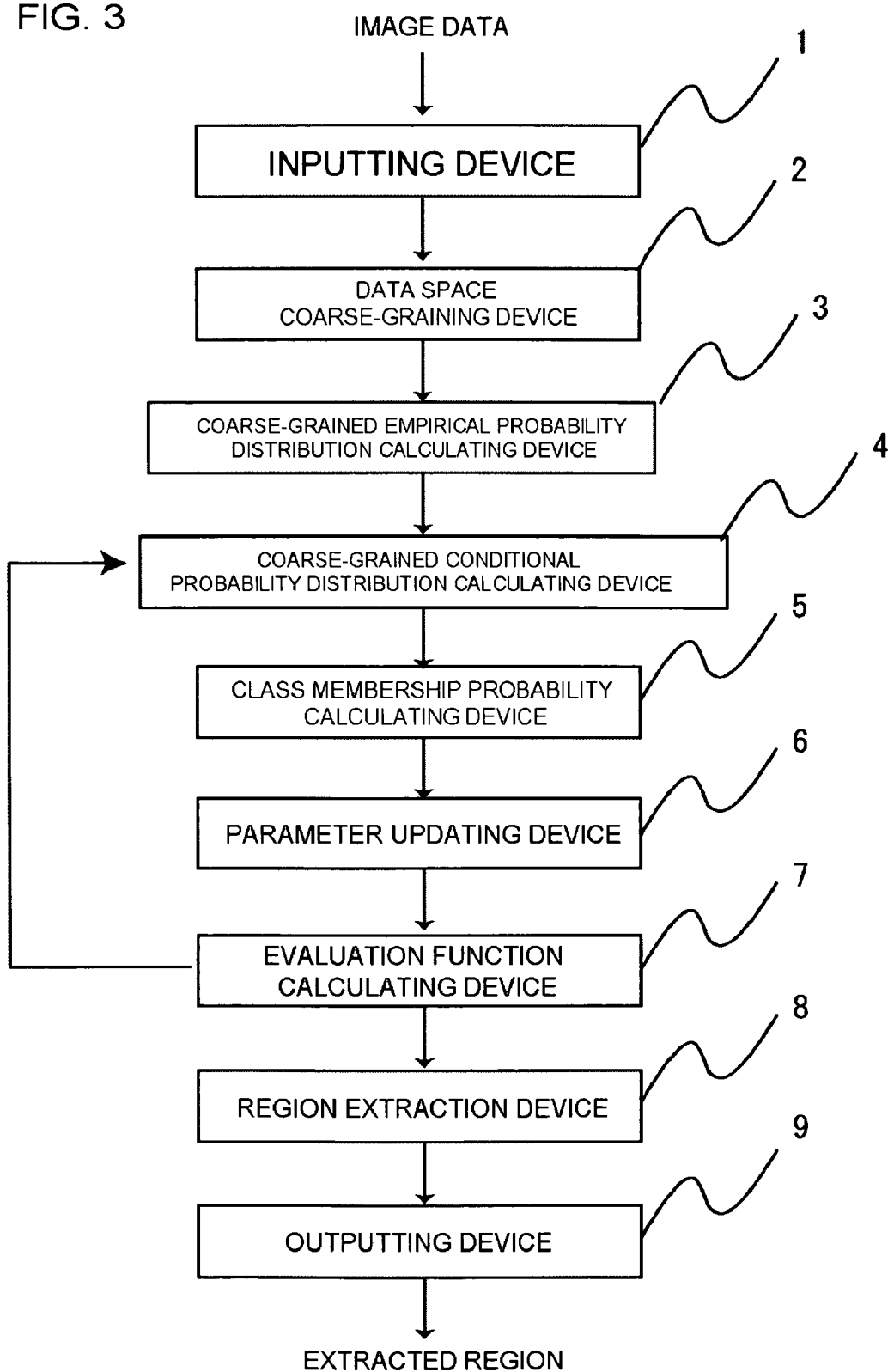
[FIG. 3] A block diagram showing an extraction processing unit shown in FIG. 2.
Figure 4:
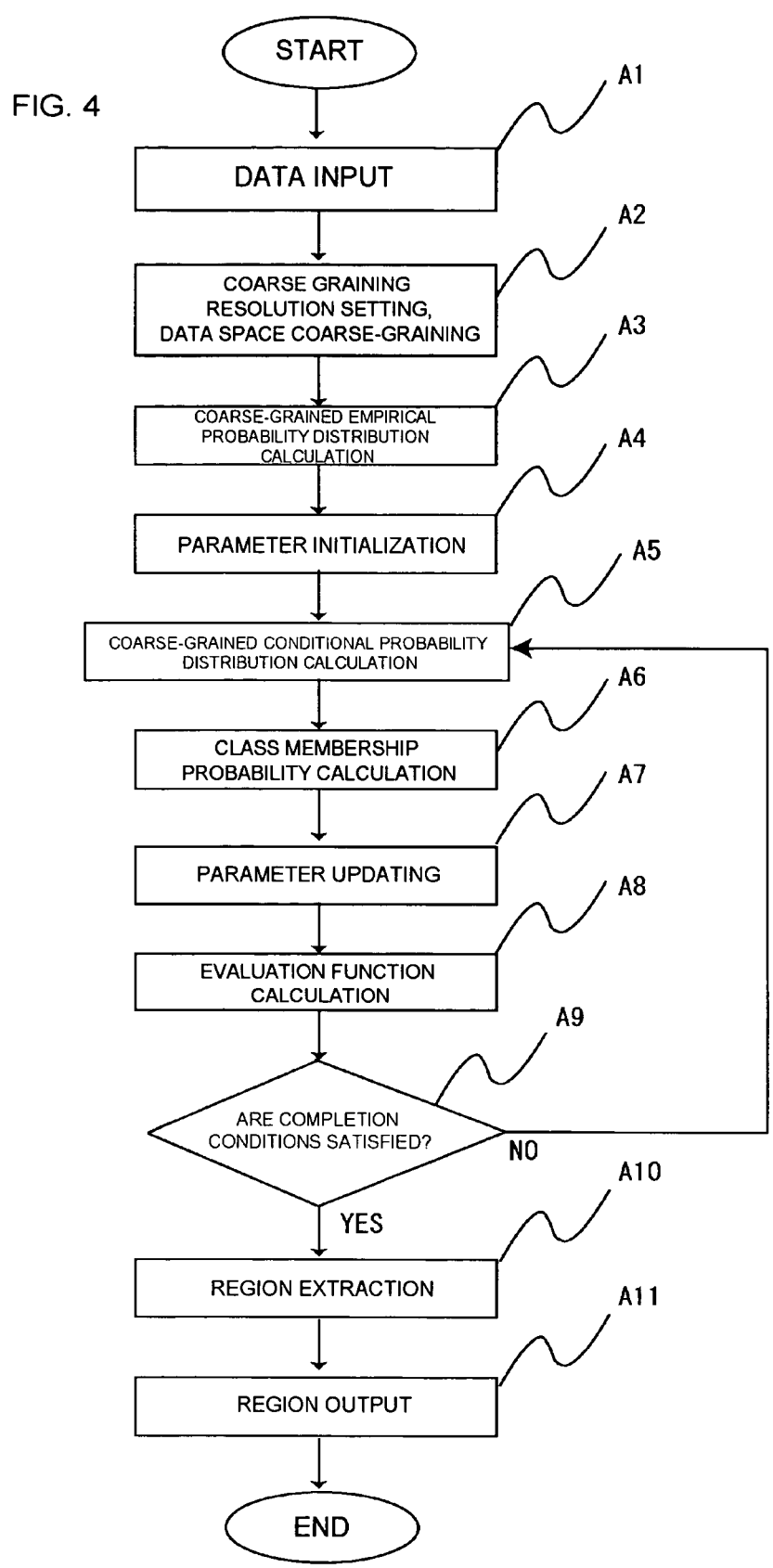
[FIG. 4] A flowchart showing a processing procedure of the extraction processing unit.

FIG. 3 is a block diagram showing the extraction processing unit 104 shown in FIG. 2. FIG. 4 is a flowchart showing a processing procedure of the extraction processing unit 104.

The extraction processing unit 104 in an embodiment of the present invention includes an inputting device 1 which reads in image data, a data space coarse-graining device 2, a parameter updating device 6, a coarse-grained empirical probability distribution calculating device 3, a coarse-grained conditional probability distribution calculating device 4, a class membership probability calculating device 5, an evaluation function calculating device 7, a region extraction device 8, and an outputting device 9.

The inputting device 1 inputs, from the image acquiring unit 102, a color image of a cell obtained by the 3D-FISH method as described above (step A1). The inputting device 1 sends the data thus read in to the data space coarse-graining device 2.

The data space coarse-graining device 2 decomposes the data space into N partial spaces that do not intersect each other so as to form a coarse-grained data space (step A2). The data space referred to here means a set of all the attribute values that the pixels of an image can take. For example, in a standard gray scale image, the attribute of each pixel may be expressed as a luminance, and the luminance is usually a one-dimensional space expressed by an integer of 0 to 255. Furthermore, in the case of a standard color image, it is usually a three-dimensional space expressed by an integer of 0 to 255 for each color element of R, G, and B.

The data space coarse-graining device 2 sections each of the RGB values into, for example, eights if the resolution is 8, and a 8×8×8 cube may be defined as one partial space. The resolution need not be identical in the axes of three dimensions. For example, coarse-graining may be carried out by sectioning the R axis into $h_1$, the G axis into $h_2$, and the B axis into $h_3$ as long as the partial spaces do not overlap each other and the entire data space is covered without fail. Hereinafter, when expressed as coarse-graining with a resolution of h, it means that the RGB values are sectioned into h×h×h.

Furthermore, the data space coarse-graining device 2 contains sets of pixels (the numbers of the pixels) that take values in each partial space, the average attribute values of these pixels, and the number of pixels.

Figure 5:
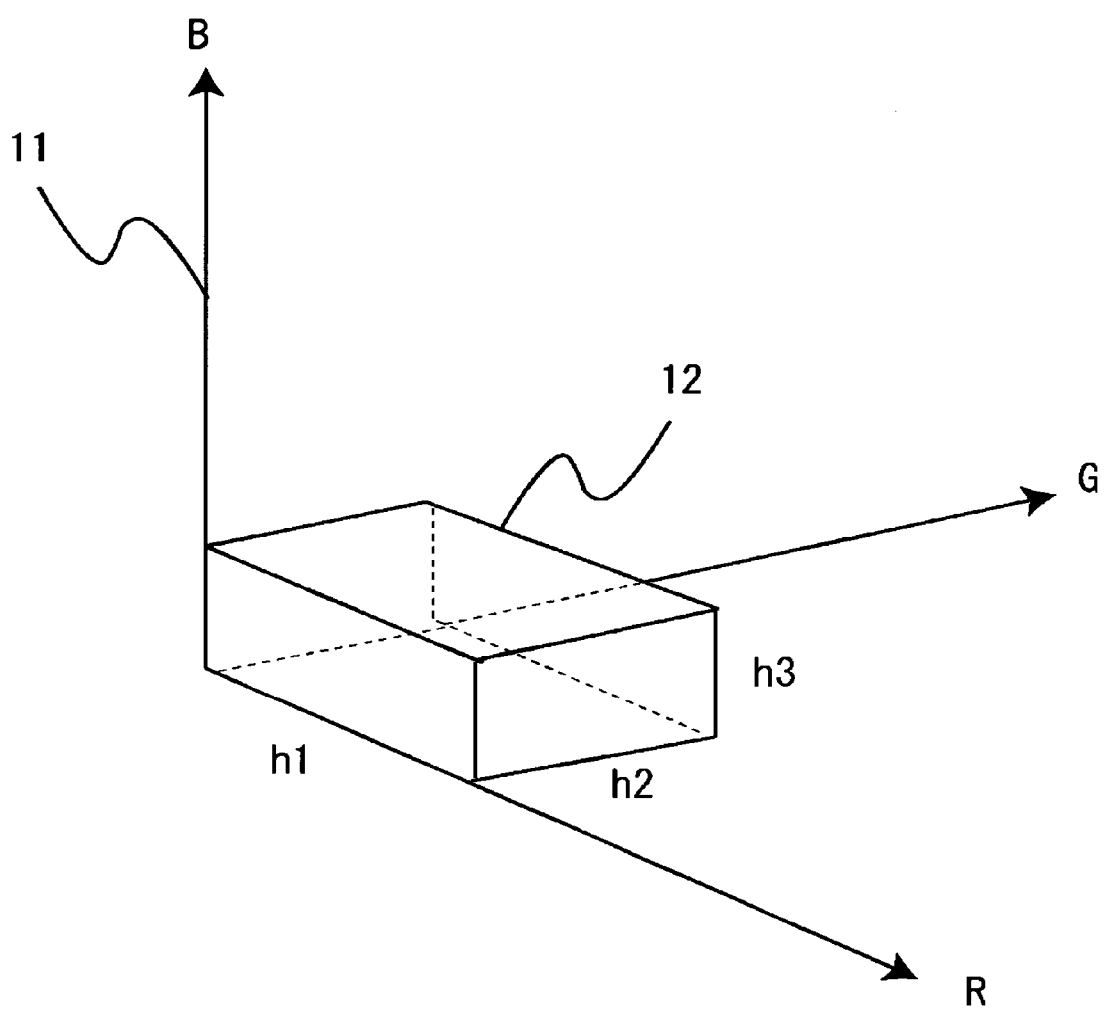
[FIG. 5] A diagram showing a coarse-grained data space and a partial space when coarse-graining has been carried out.

FIG. 5 shows a coarse-grained data space 11 and a partial space 12 when coarse-graining is carried out at a resolution of $h_1 \times h_2 \times h_3$.

For example, when an attribute value $x_j$ of a $j^{th}$ pixel is such that R=128, G=255, and B=18, if coarse-graining is carried out at a resolution of 8, this pixel takes a value in a partial space designated by an index (16, 31, 2). This is expressed below by $x_j$ being contained in this partial space.

Referring back to FIG. 3, after forming a coarse-grained data space, the data space coarse-graining device 2 sends the numbers of the pixels contained in each partial space and the number of pixels to the coarse-grained empirical probability distribution calculating device 3.

The coarse-grained empirical probability distribution calculating device 3 calculates a coarse-grained empirical probability distribution (step A3). The coarse-grained empirical probability distribution referred to here indicates a probability distribution calculated from a value obtained by dividing observation data contained in each partial space of the coarse-grained data space by the total number of pixels. The coarse-grained empirical probability distribution calculating device 3 sends the coarse-grained empirical probability distribution to the coarse-grained conditional probability distribution calculating device 4.

The coarse-grained conditional probability distribution calculating device 4 initializes a class parameter (step A4). The procedure of determining an initial value for the parameter is described later. The coarse-grained conditional probability distribution calculating device 4 also calculates a coarse-grained conditional probability distribution (step A5). Specifically, the coarse-grained conditional probability distribution is calculated as follows. Here, it is assumed that a conditional probability under the condition that the $j^{th}$ pixel value is generated from an $i^{th}$ class is given by the multidimensional normal distribution shown below.

[Eq. 17]
$$f(x|\phi_i) = \frac{1}{\sqrt{(2\pi)^3|\Sigma_i|}} \exp\left[-\frac{1}{2}(x-\mu_i)^T \Sigma_i^{-1} (x-\mu_i)\right] \quad (15)$$

Here, x denotes a three-dimensional vector formed from each color of RGB, $\mu_i$ denotes a three-dimensional vector showing an average color of the $i^{th}$ class, $\Sigma_i$ denotes a covariance matrix of the $i^{th}$ class, and $|\Sigma_i|$ and $\Sigma_i^{-1}$ denote the determinant and the inverse matrix respectively of the matrix $\Sigma_i$. Furthermore, $(x-\mu_i)^T$ denotes transposition.

In the case in which the image is a gray scale, a conditional probability under the condition that the $j^{th}$ pixel value is generated from the $i^{th}$ class is given by a one-dimensional normal distribution shown below.

$$f(x|\phi_i) = \frac{1}{\sigma_i \sqrt{2\pi}} \exp[-(x-\mu_i)^2 / 2\sigma_i^2] \quad [\text{Eq. 18}]$$

Here, x denotes a scalar value expressing a luminance value, $\mu_i$ denotes a scalar value expressing an average luminance of the $i^{th}$ class, and $\sigma_i$ denotes a standard deviation of the luminance of the $i^{th}$ class.

The coarse-grained conditional probability distribution calculating device 4 calculates this conditional probability using an equation given by Equation (6). In this process, a measure m ($A_j$) of each partial space is the volume of each partial space. For example, when coarse-graining is carried out uniformly at a resolution of 8, it is 8×8×8=512.

The coarse-grained conditional probability distribution calculating device 4 may approximate the coarse-grained conditional probability distribution using Equation (13). In accordance with this method, it becomes unnecessary to carry out the operation given by Equation (6) each time the parameter is updated, thereby greatly reducing the amount of calculation.

The coarse-grained conditional probability distribution calculating device 4 is capable of determining an initial value for the parameter based on the coarse-grained empirical probability distribution. It roughly classifies each partial space, determines an average value or a variance value within each class obtained as a result of the classification, and determines these values as initial values for parameter estimation.

Figure 6:
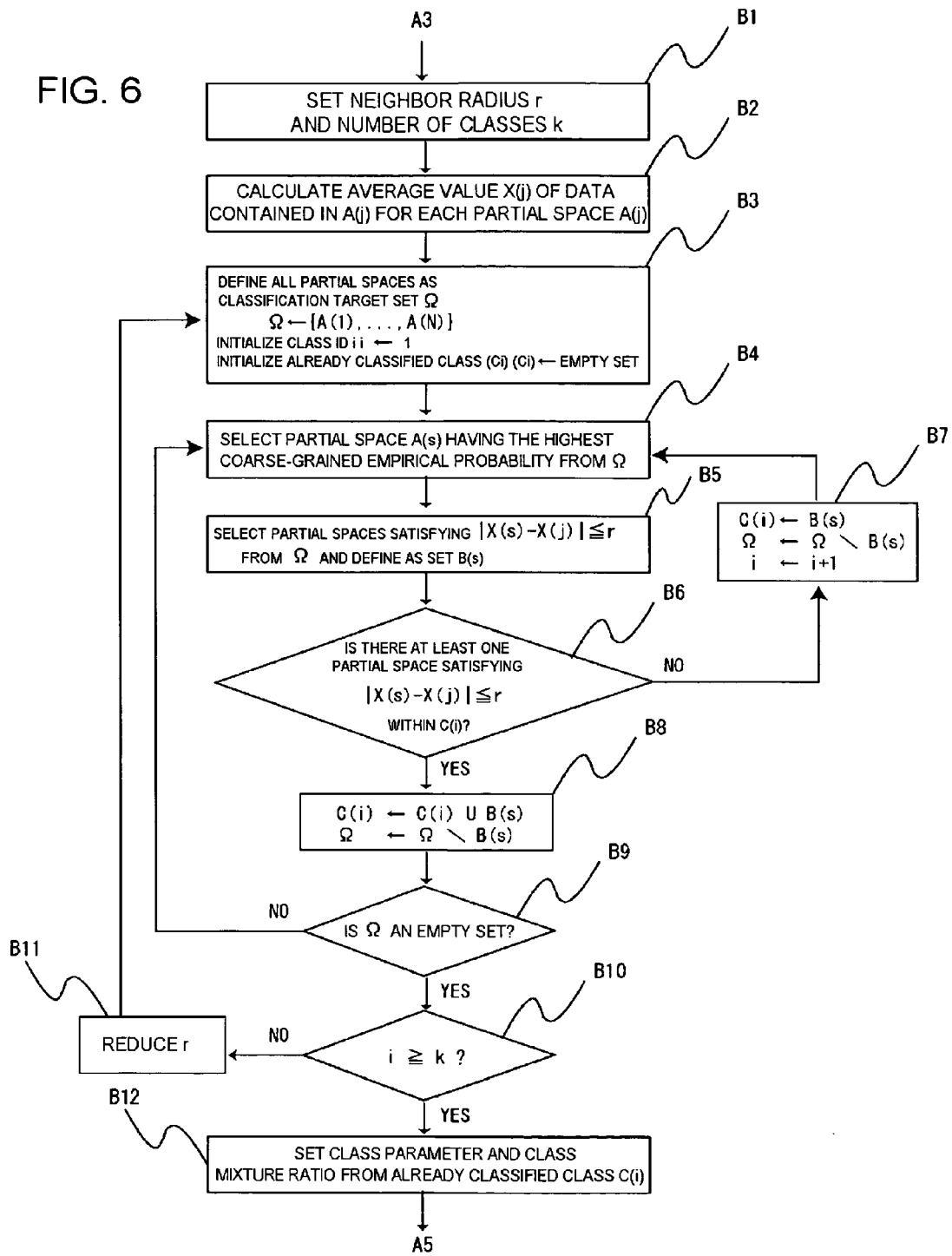
[FIG. 6] A flowchart showing a processing procedure of initial value determination for a parameter based on a coarse-grained empirical distribution.

FIG. 6 is a flowchart showing a processing procedure of determining an initial value for a parameter based on the coarse-grained empirical distribution. The procedure of setting an initial value for the parameter is explained below with reference to FIG. 6.

Firstly, in step B1, a neighbor radius and a number of classes that are to be classified are set. The neighbor radius referred to here is a reference value for carrying out a rough classification by considering all of the partial spaces within the range to belong to the same class. For example, in the case of a color image, pixels having similar colors have RGB values that are close to each other, and they can therefore be naturally considered to be classified into the same class.

When the neighbor radius is too large, classification might be completed before a desired number of classes is attained. In such a case, as described later, the neighbor radius is reduced, and classification is carried out again. It is thereby possible to finally carry out classification into a necessary number of classes. An initial value for this neighbor radius is therefore set at a sufficiently large value, for example, 50. As the number of classes to be classified into, a given value is used as it is.

Subsequently, in step B2, a representative value for each partial space is set for each partial space. As the representative value for each partial space, for example, a median value, et cetera, of the partial space can be used. Hereinafter, a distance between these representative values is defined as a distance between partial spaces.

Subsequently, a set of partial spaces, which become a classification target, is set (step B3). Hereinafter, this set is expressed as $\Omega$. An initial value for $\Omega$ is a set formed from all the partial spaces containing data. Furthermore, the number i of already classified classes is 1, and an initial value for an already classified class $C_i$ is an empty set.

Subsequently, among the partial spaces belonging to $\Omega$, a partial space that has the highest coarse-grained empirical probability is selected (step B4). This partial space is expressed as $A_s$. Subsequently, a distance between a partial space belonging to $\Omega$ and $A_s$ is examined, all the partial spaces that are within a neighbor radius r are selected, and this is determined to be a neighbor set (step B5). Hereinafter, the neighbor set is expressed as $B_s$.

Subsequently, the shortest distance between a partial space contained in the already classified class $C_i$ and a partial space contained in the neighbor set $B_s$ is determined, and it is examined whether or not this is larger than the neighbor radius r (step B6). If this shortest distance is larger than r, since the neighbor set $B_s$ has an attribute that is sufficiently different from that of the already classified class and appears with high probability, it may be considered to be a new class. Therefore, the neighbor set is employed as a new class as it is. Since classification of $B_s$ has been completed, it is deleted from the classification target set $\Omega$. In FIG. 6, this deletion is expressed using the code '$\Omega \leftarrow \Omega \backslash Bs$'. After $\Omega$ is updated, the flowchart returns to step B4 (step B7).

If the shortest distance between a partial space contained in the already classified class $C_i$ and a partial space contained in the neighbor set $B_s$ is smaller than the neighbor radius r, since the neighbor set $B_s$ and the $C_i$ can be considered to have close attributes, $B_s$ is integrated with $C_i$. Since classification of $B_s$ has been completed, it is deleted from the classification target set $\Omega$ (step B8).

Subsequently, whether or not $\Omega$ is an empty set is examined (step B9); if it is not an empty set, the flowchart goes to step B4, if $\Omega$ is an empty set, whether or not the number of classified classes is equal to or greater than k is examined (step B10), and if it is equal to or less than k, the neighbor radius is reduced by multiplying the neighbor radius by a constant that is smaller than 1. With regard to this constant, for example, a value of 0.9, et cetera, may be used. Following this, step B3 and thereafter are repeated.

In step B9, if $\Omega$ is an empty set and the number of already classified classes is larger than a given number, then since classification into a desired number of classes is completed, a class parameter of each class is calculated, this is defined as an initial value for the class parameter, and the ratio of the number of partial spaces contained in each class is defined as an initial value for the class mixture ratio (step B12).

Figure 7:
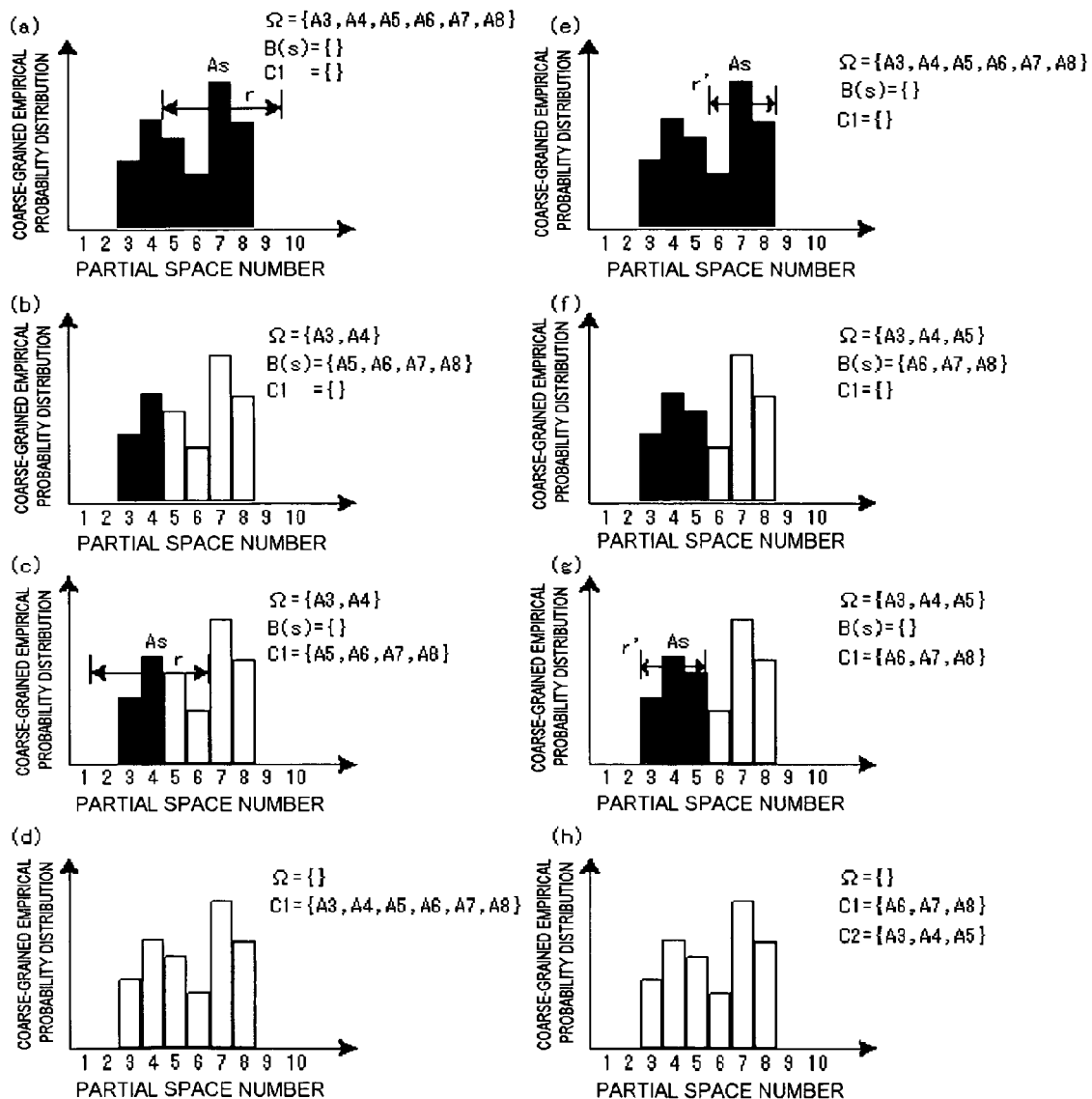
[FIG. 7] A diagram specifically explaining the procedure explained with reference to FIG. 6.

FIG. 7 is a diagram specifically explaining the procedure explained with reference to FIG. 6. It is assumed here that the data space is one-dimensional, and a total of 10 partial spaces are set (FIG. 7(a)). In FIG. 7(a), the abscissa denotes the numbers of the partial spaces, and the ordinate denotes a coarse-grained empirical probability distribution. Hereinafter, the principal object is to explain the flow of processing intuitively, and specific values are therefore not used for the coarse-grained empirical probability value, the representative value of the partial space, and the neighbor radius.

In step B1, the number of classes is for example 2, and the neighbor radius is r. In step B2, a representative value for each partial space is set. In step B3, initial values for the classification target set Q are all the partial spaces containing data, as follows.

$$\Omega = \{A_3, A_4, A_5, A_6, A_7, A_8\}$$

Since $A_1, A_2, A_9$, and $A_{10}$ have a coarse-grained probability of 0, that is, no data are observed to be contained in these partial spaces, they are not included in the classification target set.

In step B4, among the partial spaces included in the classification target set, $A_7$, which has the highest coarse-grained empirical probability, is selected and defined as As (FIG. 7(a)). In step B5, a partial space that is present within the neighbor radius r from $A_7$ is selected and defined as Bs. Since the partial spaces that are present within the neighbor radius shown in FIG. 7(a) are $$A_5, A_6, A_7, \text{and } A_8, \text{ then}$$

$$Bs = \{A_5, A_6, A_7, A_8\}$$

(FIG. 7(b)).

In step B6, since there are not yet classified classes, $B_s$ is employed as an initial class $C_1$ as it is, $B_1$ is deleted from the classification target set, and the flowchart returns to step B4. In FIG. 7(b), blank white bars of the bar graph showing the extent of the coarse-grained empirical probability mean that the partial spaces have been deleted from the classification target set.

In step B4, since $A_4$ has the highest coarse-grained empirical probability among the remainder of the classification target set, this is defined anew as $A_s$ (FIG. 7(c)). In step B5, a partial space that is present within the neighbor radius r from $A_4$ is selected and defined as $B_s$. Here, it is expressed as follows.

$$B_s = \{A_3, A_4\}$$

In step B6, by examining the already classified classes, that is, $$C_1 = \{A_5, A_6, A_7, A_8\}$$

they are found to include $A_5$ and $A_6$, which are within the neighbor radius r from A4. Therefore, the current $B_s$ is integrated with the already classified class $C_1$ (FIG. 7(d)).

The classification target set thereby becomes empty, and classification of all the partial spaces is completed, but the number of classified classes is 1 and has not attained a desired number of classes of 2 (step B10). Therefore, the neighbor radius is reduced (step B11), and step B3 and thereafter are repeated.

Hereinafter, the reduced radius is expressed as r' (FIG. 7(e)), and the same procedure as in the above-mentioned explanation is repeated. However, since the neighbor radius is reduced this time, the following difference occurs. That is, this time a partial space that is present within the neighbor radius r' of $A_7$ is as follows.

$$B_s = \{A_6, A_7, A_8\}$$

This $B_s$ is employed as a first class $C_1$ as it is, and $A_4$, which has the highest coarse-grained empirical probability among the remainder of the classification target set, is selected (FIG.

7 (g)) Partial spaces that are present within the neighbor radius r' from $A_4$ are as follows.

$$B_s = \{A_3, A_4, A_5\}$$

Since this time the already classified class $C_1$ contains no partial space that is within the neighbor radius r' from $A_4$, the current $B_s$ is employed as anew class $C_2$ (FIG. 7 (h)). This results incompletion of classification of all the partial spaces into two classes as desired.

When rough classification is completed, an average and a variance are determined within the classified class, and they may be used as initial parameters for estimation carried out thereafter. By setting an initial value for a parameter by such a method, the amount of calculation following this may be reduced and region extraction may be carried out at high speed. Furthermore, appropriately setting an initial parameter is effective in preventing falling into a local optimum solution during maximization of the coarse-grained log likelihood.

Referring back to FIG. 3, the coarse-grained conditional probability distribution calculating device 4 may determine a coarse-grained conditional probability distribution using the parameter determined above as an initial value. The coarse-grained conditional probability distribution calculating device 4 sends the determined coarse-grained conditional probability distribution to the class membership probability calculating device 5.

The class membership probability calculating device 5 calculates a class membership probability using Equation (11) (step A6). This class membership probability indicates the probability of a pixel contained in a $j^{th}$ partial space belonging to an $i^{th}$ class. Therefore, by calculating a class membership probability for each image pixel, and classifying each pixel into a class for which the probability is high, region extraction can be carried out easily. The class membership probability calculating device 5 sends the calculated class membership probability to the parameter updating device 6.

The parameter updating device 6 updates the parameter so as to maximize Equation (9). Specifically, the parameter is updated as follows.

[Eq. 19]

$$w_i = \sum_{j=1}^{N} \tilde{q}_j \tilde{\pi}_{ij} \quad (16)$$

$$\mu_i = \frac{\sum_{j=1}^{N} \tilde{q}_j \tilde{\pi}_{ij} \tilde{x}_j}{\sum_{j=1}^{N} \tilde{q}_j \tilde{\pi}_{ij}} \quad (17)$$

$$\sum_i = \frac{\sum_{j=1}^{N} \tilde{q}_j \tilde{\pi}_{ij} (\tilde{x}_j - \mu_i) \otimes (\tilde{x}_j - \mu_i)^T}{\sum_{j=1}^{N} \tilde{q}_j \tilde{\pi}_{ij}} \quad (18)$$

Here, $$u \otimes v^T \quad \text{[Eq. 20]}$$

represents a matrix having a product $u_i v_j$ of an i component and a j component of vectors u and v as an $i_j$ element.

[Eq. 21]

$$\tilde{x}_j$$

is the average value of data contained in the $j^{th}$ partial space $A_j$, which is defined by Equation (14).

In the case where the image is a gray scale, updating of wi and μi may be carried out in the same manner as above using a luminance value as x, and updating of the standard deviation σ is as follows.

$$\sigma_i^2 = \frac{\sum_{j=1}^{N} \tilde{q}_j \tilde{\pi}_{ij} (\tilde{x}_j - \mu_i)^2}{\sum_{j=1}^{N} \tilde{q}_j \tilde{\pi}_{ij}} \quad \text{[Eq. 22]}$$

As described above, by updating the parameter in this way, the coarse-grained complete log likelihood given by Equation (9) increases, and the coarse-grained average log likelihood given by Equation (12) also increases (Non-patent Publication 3). The parameter updating device 6 updates the parameter and then sends the updated parameter to the evaluation function calculating device 7. The evaluation function calculating device 7 calculates a coarse-grained log likelihood using Equation (12) (step A8).

Furthermore, as the evaluation function, other than the coarse-grained log likelihood shown by Equation (12), the Akaike Information Criterion (AIC: Akaike Information Criterion), the MDL, or the Structural Risk, which will be explained below, may be used.

Firstly, the AIC is explained.

[Eq. 23]

$$L_{AIC} = -2n\tilde{L} + 2m \quad (19)$$

Here, it is possible to use an evaluation function for which the smaller the AIC, the better the estimation result. Here, m denotes the total number of parameters. Since the AIC is proportional to an amount obtained by multiplying the coarse-grained log likelihood by a negative, the AIC changes in a direction such that it decreases when updating using the parameter changing device 6. Furthermore, since a term that is proportional to the parameter is added, an estimation result obtained using a model having fewer parameters is considered to be better for identical coarse-grained log likelihoods. In accordance with use of this evaluation function, it is possible to suppress excessive fitting to data and carry out an estimation that is resistant to noise.

Furthermore, the same effect may be obtained using the MDL below.

[Eq. 24]

$$L_{MDL} = -n\tilde{L} + \frac{m}{2} \log n \quad (20)$$

Moreover, the same effect may be obtained using the Structural Risk below.

[Eq. 25]

$$L_{SRM} = \frac{\tilde{L}}{1 - c\sqrt{a_1 \frac{h(|na_2 n/h + 1) - \ln(\eta/4)}{n}}} \quad (21)$$

Here, $\eta$ denotes that Equation (21) holds true with a probability of $\eta$ and usually takes a value of 0.01, et cetera. c, $a_1$, and $a_2$ are constants that are determined by properties of the probability distribution, and usually take values such that c=1, $a_1$=1, and $a_2$=1, et cetera. h is called a VC dimension and is an amount proportional to the number of parameters.

The evaluation function calculating device 7 examines whether or not a change in the evaluation function satisfies given completion conditions; if the completion conditions are satisfied, it sends a current parameter to the region extraction device 8, and if the completion conditions are not satisfied, it sends the current parameter to the coarse-grained conditional probability distribution calculating device 4 (step A9). With regard to the completion conditions, for example, a difference between the current evaluation function value and the evaluation function value calculated the previous time is divided by the current evaluation function value, and whether or not the absolute value of the value thus obtained is equal to or less than 0.0001 is examined.

The region extraction device 8 receives a parameter from the evaluation function calculating device 7, and extracts a region using parameter information (step A10). For example, in order to extract a region belonging to the $i^{th}$ class, the value of the class membership probability is examined for j=1 to j=N, and a partial space that has a probability of not less than a certain value (threshold value) is defined as a partial class belonging to the $i^{th}$ class. Subsequently, pixels contained in that partial space are examined, and these pixels are extracted as being in the $i^{th}$ region. By using, for example, 0.5 as the threshold value for the class membership probability, a desired result may be obtained.

It is also possible for the region extraction device 8 to automatically set the threshold value. The following processing is carried out for this. In order to extract the $i^{th}$ region, the estimated class mixture ratio $w_i$ is firstly multiplied by the total number of pixels, and an estimated number of pixels belonging to each class is determined. This figure is expressed as $n_i$.

Subsequently, the class membership probability is examined for j=1 to j=N, pixels contained in the partial spaces are extracted, in order from the highest value of the partial space, and this is continued until the extracted pixels reach $n_i$. When the number of pixels extracted the $n_i^{th}$ time is denoted by 1, the value of the coarse-grained class membership probability of Equation (11) becomes a threshold value for the probability of belonging to the $i^{th}$ region. By use of the threshold value thus automatically set, a chromosome territory can be, extracted from an image with good accuracy. Furthermore, the same effect may be obtained by the following. Firstly, a membership probability represented by Equation (11) is calculated for all the pixels. By so doing, the membership probability for each of the k classes can be obtained for each pixel. Subsequently, only the pixel for which the membership probability for the $i^{th}$ class is the highest is extracted. The number of the pixels thus extracted should substantially coincide with the above-mentioned $n_i$. By examining, among these pixels, the pixel having the largest luminance and the pixel having the smallest luminance, an upper limit value and a lower limit value for the luminance belonging to the $i^{th}$ class can automatically be obtained. Since a region of the chromosome territory should be displayed as a region having high luminance on an image, if the above-mentioned procedure is carried out for a class having the maximum average luminance as a subject, it is possible to automatically extract a chromosome territory region. After extraction of a region is completed, the region extraction device 8 sends data of the extracted region to the outputting device 9.

The data space coarse-graining device 2, the coarse-grained empirical distribution calculating device 3, the coarse-grained conditional probability distribution 4, the class membership probability calculating device 5, the parameter updating device 6, the evaluation function calculating device 7, and the region extraction device 8, which are described above, may be constructed, for example, using a computer such as a personal computer, a work station, or a supercomputer. The outputting device 9 receives region data from the region extraction device 8 and outputs it to the quantification processing unit 106 of FIG. 2 (step A11). Moreover, output from the outputting device 9 may be displayed by the outputting unit 112.

Figure 8:
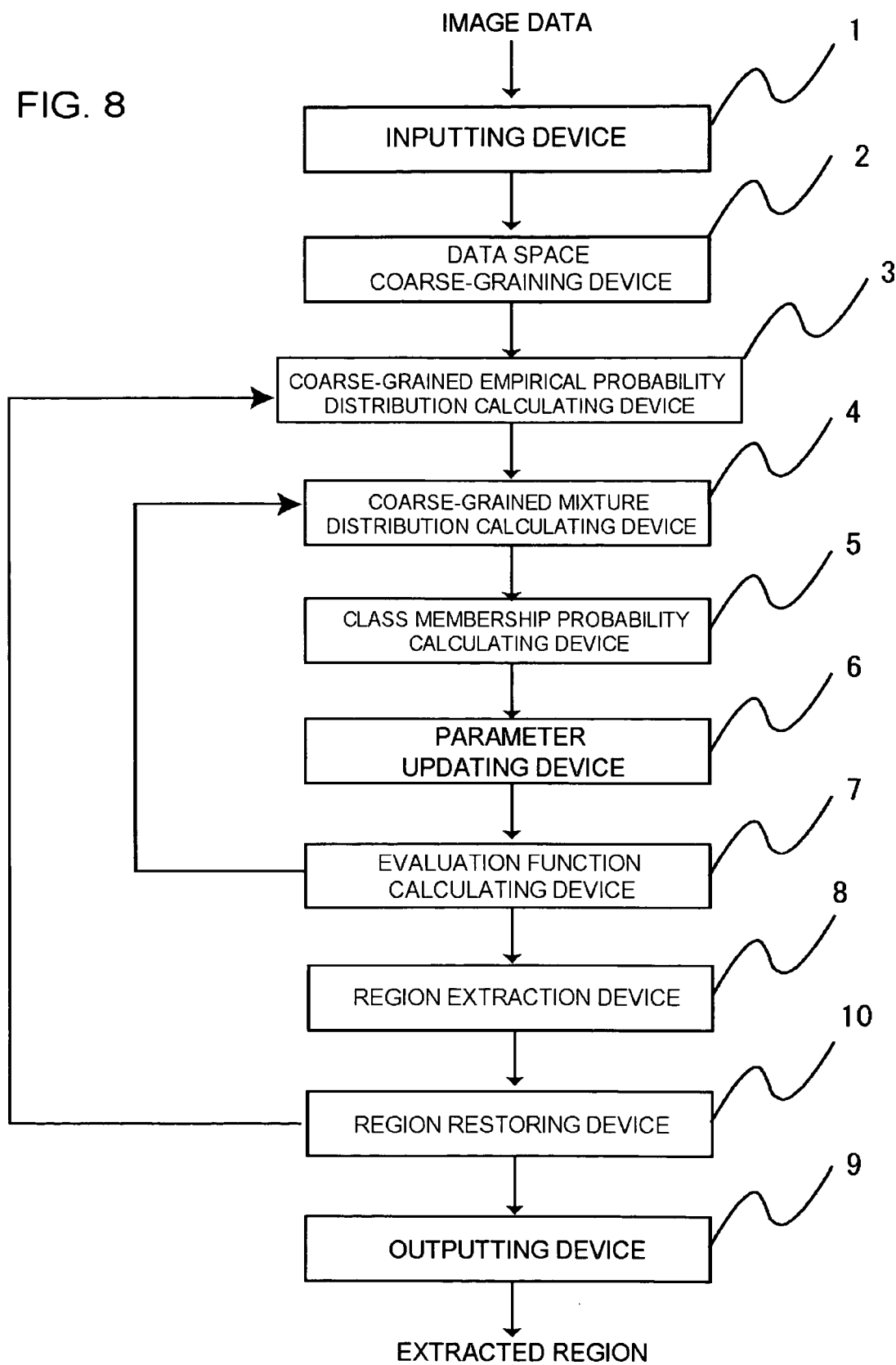
[FIG. 8] A block diagram showing another example of the extraction processing unit.
Figure 9:
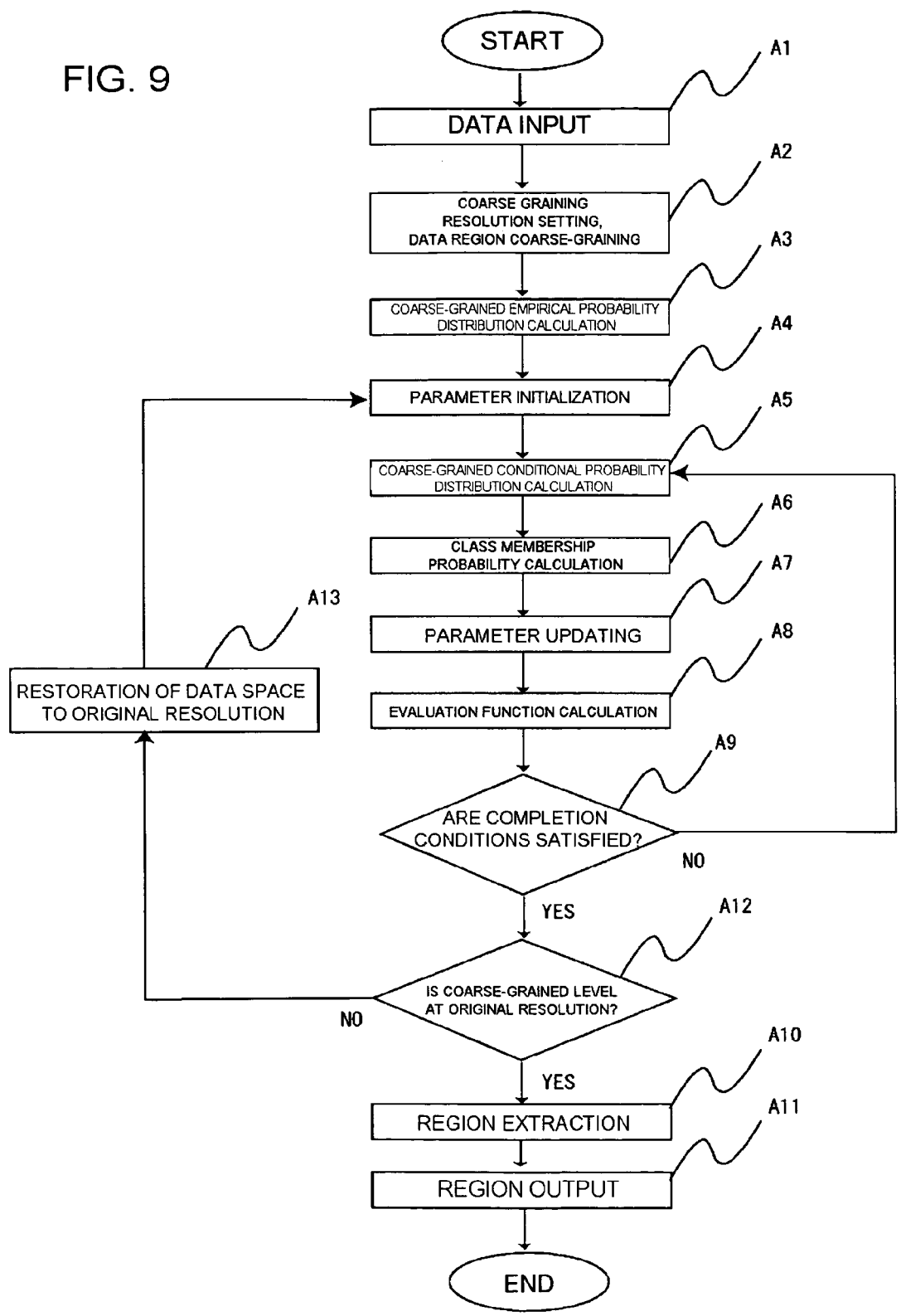
[FIG. 9] A flowchart showing a processing procedure of the extraction processing unit shown in FIG. 8.

FIG. 8 is a block diagram showing another example of the extraction processing unit 104. FIG. 9 is a flowchart showing the processing procedure of the extraction processing unit 104 shown in FIG. 8. The same constituent elements as those explained with reference to FIG. 3 and FIG. 4 are hereinafter denoted by the same reference numerals and symbols, and their explanation is not represented where appropriate.

Here, a region restoring device 10 examines, after parameter estimation using the coarse-grained probability distribution is completed, whether the coarse-graining resolution is equal to the original resolution (step A12), and returns the data to the original resolution if it has been coarse-grained (step A13). If it has not been coarse-grained, since this means that estimation at the original resolution is completed, the parameter estimated at the original resolution is sent to a region extraction device 8. For returning data to the original resolution, the coarse-graining resolution may be set at the minimum unit of the data attribute value (for example, 1), and exactly the same method as the method described in the first embodiment may be repeated. In this case, estimation takes a longer time compared with the method explained with reference to FIG. 3 and FIG. 4, but a parameter can be estimated with higher accuracy, and as a result it becomes possible to extract a region with high accuracy. Furthermore, since a parameter estimated using the coarse-grained probability distribution has already been estimated in the neighborhood of an optimum parameter, the optimum parameter can be estimated with a smaller number of times of updating the parameter compared with a case in which estimation is carried out at high resolution from the beginning, and region extraction can be carried out at a much higher speed.

(Positioning State Quantification (S22))

Referring back to FIG. 2, the quantification processing unit 106 carries out standardization processing, prior to quantification of a positioning state of a chromosome territory, by transforming the coordinates of the chromosome territory extracted by the extraction processing unit 104 in accordance with certain criteria. By carrying out this processing, a positioning state of a chromosome territory may be quantified in accordance with unified criteria for a plurality of samples. By so doing, the results of the quantification of a positioning state of a chromosome territory for a plurality of samples may be statistically processed, et cetera.

Figure 10:
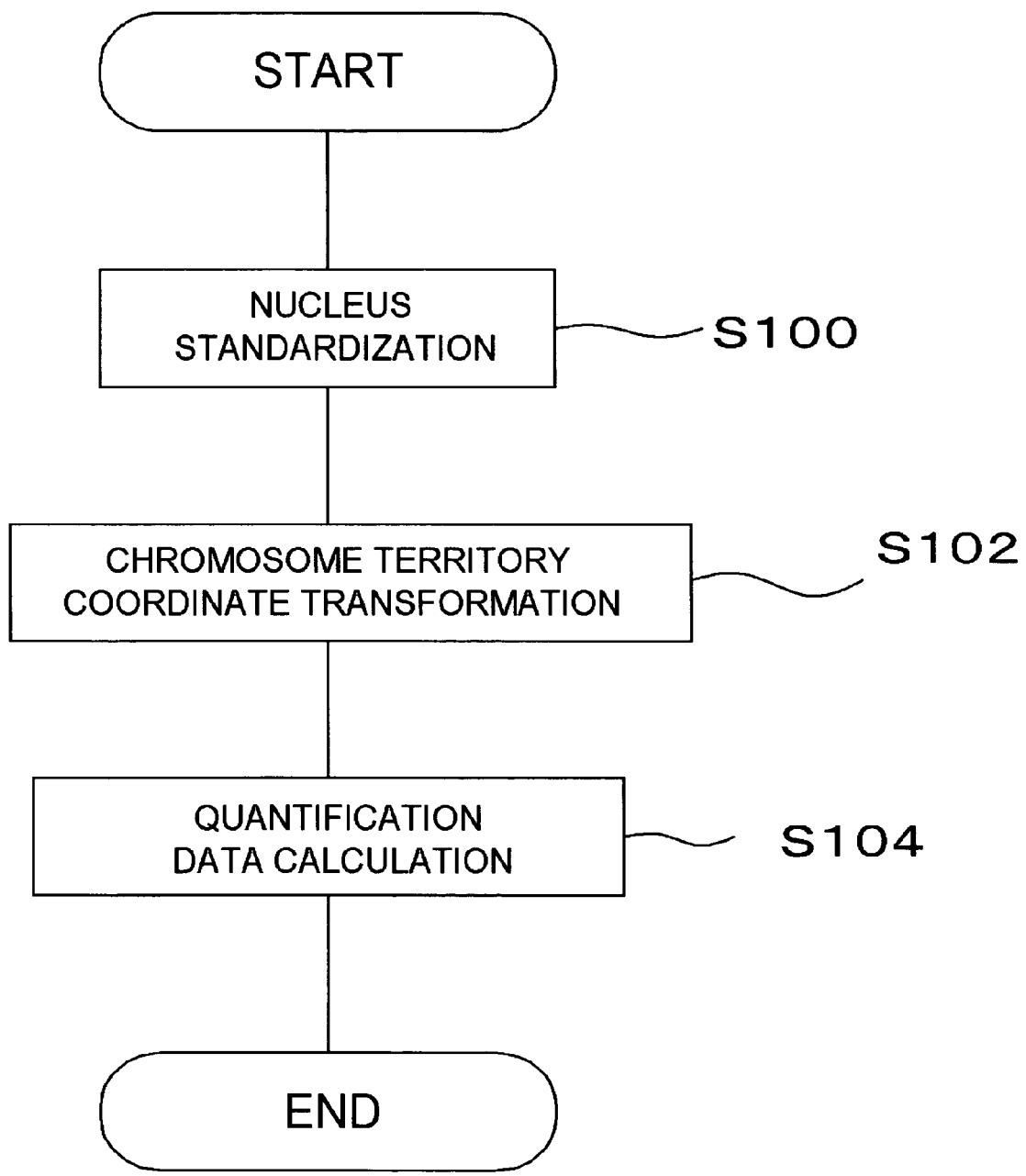
[FIG. 10] A flowchart showing a processing procedure for quantifying a positioning state of a chromosome territory.

FIG. 10 is a flowchart showing a processing procedure of quantifying a positioning state of a chromosome territory. FIG. 11 is a schematic diagram showing the manner in which the coordinates of a chromosome territory are transformed. The coordinate transformation processing procedure is explained below with reference to FIG. 10 and FIG. 11.

The quantification processing unit 106 standardizes a cell nucleus 120 shown in FIG. 11(a) (FIG. 10, S100). Here, first of all, a center of gravity $P_0$ and a volume V of the cell nucleus 120 are calculated. Subsequently, as shown in FIG. 11(b), a reference sphere 124 is calculated so as to have the center of gravity $P_0$ as the center and the volume V. Here, the cell nucleus 120 includes a chromosome territory 122. Although not illustrated in the figure, the cell nucleus 120 may include a plurality of chromosome territories.

Following this, the coordinates of the chromosome territory 122 are transformed according to the form and size of the cell nucleus 120 and the reference sphere 124 (FIG. 10, S102). Specifically, as shown in FIG. 11(c), a straight line l is envisioned that passes through the center of the reference sphere 124 (the same as the center of gravity $P_0$) and a certain point p within the chromosome territory 122, and a distance R between the center $P_0$ and the surface of the cell nucleus 120 on the straight line l is calculated. At the same time, a distance $r_0$ between the center $P_0$ and the surface of the reference sphere 124 on the straight line l is calculated. Here, as shown in FIG. 11(d), when the point p within the chromosome territory 122 is transformed to a point within the reference sphere 120, the coordinates p' within the reference sphere 120 are expressed as follows.

$$p'=r_0/R \times (p-P_0)+P_0$$

By transforming in the same manner all the points within the chromosome territory 122, a chromosome territory 126 that has been coordinate-transformed within the reference sphere 124 can be obtained.

In the present embodiment, after the quantification processing unit 106 carries out the above-mentioned coordinate transformation of the chromosome territory, it quantifies a positioning state of the chromosome territory (FIG. 10, S104).

Figure 12:
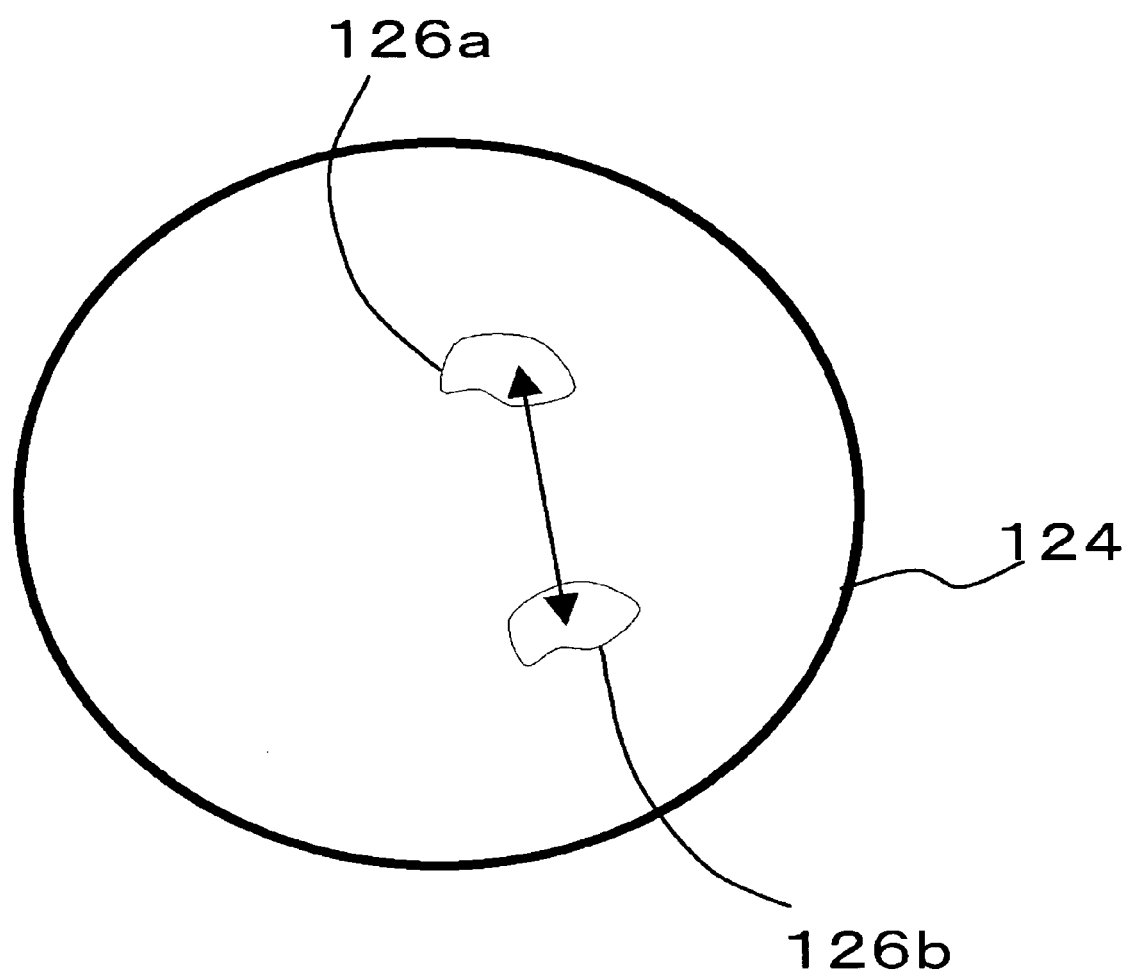
[FIG. 12] A diagram showing a plurality of chromosome territories whose coordinates have been transformed into the interior of a reference sphere.

FIG. 12 is a diagram showing a plurality of chromosome territories, that is, chromosome territory 126a and chromosome territory 126b, which are coordinate-transformed within the reference sphere 124. Here, an example in which a distance between a plurality of chromosome territories is used as the quantification result of the positioning state is shown. The quantification processing unit 106 calculates the distance between the chromosome territory 126a and the chromosome territory 126b thus coordinate-transformed.

By carrying out the above-mentioned coordinate transformation of the chromosome territory, the quantification result of a positioning state of the chromosome territory in a plurality of various forms of samples can be processed using a unified index. Furthermore, in the same cell, the cell nucleus can take various forms depending on the stage. In the present embodiment, by carrying out such a coordinate transformation, it is possible to appropriately quantify a positioning state of a chromosome territory while eliminating the influence of such changes in the form of the cell nucleus according to the stage.

Furthermore, when the distance between chromosome territories is used as the quantification result of a positioning state, the quantification processing unit 106 may use as a quantification result a value obtained by dividing the distance between chromosome territories by the radius of the reference sphere 124. This enables the quantification results of the positioning state of the chromosome territories in a plurality of samples having different nucleus sizes to be processed with a unified index.

A method of quantifying the positioning state of a chromosome territory is now explained.

The positioning state of the chromosome territory may be quantified using a distance between a plurality of chromosome territories, the spread of the chromosome territory, the distribution direction, a distance between the chromosome territory and a reference point within a cell, et cetera.

In the case in which quantification is carried out using the distance between a plurality of chromosome territories, the distance between the plurality of chromosome territories may be calculated by various methods.

For example, the quantification processing unit 106 may calculate a center of gravity of each of the chromosome territories, and calculate a distance between the centers of gravity. The center of gravity referred to here is the center of gravity of an area when it is assumed that each pixel forming the chromosome territory has equal specific gravity.

As the position of the center of gravity of each of the chromosome territories, for example, a center of gravity weighted by the luminance value described below may be used.

$$X_G = \Sigma_j I_j X_j / \Sigma_j I_j$$

Here, $I_j$ is a luminance value of a pixel at a position $x_j$. The position of the pixel having the highest luminance value may be used instead of the center of gravity. Hereinafter, a case of a simple center of gravity is explained, but a distance between chromosomes may be defined by the same method when a weighted center of gravity or the position of a pixel having the highest luminance is used.

Furthermore, the quantification processing unit 106 may also calculate a distance between boundaries of a plurality of chromosome territories. The distance between the boundaries of the chromosome territories referred to here is for example the shortest distance between the surfaces of the plurality of chromosome territories.

Moreover, the quantification processing unit 106 may approximate the form of each of the plurality of chromosome territories by a normal distribution, calculate an average value of the normal distribution of each of these chromosome territories, and calculate a distance between the average values. Furthermore, after the form of each of the plurality of chromosome territories is approximated by the normal distribution, the center of gravity of each of the chromosome territories may be calculated as described above to thus calculate the distance between the centers of gravity, or the distance between the boundaries may be calculated.

Furthermore, the quantification processing unit 106 may detect a framework line of each of the plurality of chromosome territories, calculate the center of gravity of each skeleton line, and calculate a distance between the centers of gravity.

Moreover, the quantification processing unit 106 may calculate a distance between a plurality of chromosome territories by calculating the Mahalanobis distance, the Bhattacharyya distance, the Kullback-Leibler distance, the symmetrical Kullback-Leibler distance, or the absolute distance.

The Mahalanobis distance may be calculated in accordance with the equation below.

[Eq. 26]

$$D=(\mu_1-\mu_2)^T \Sigma^{-1}(\mu_1\mu_2)$$

Here, $\mu_i$ (i=1, 2) denotes an average vector, $\Sigma$ denotes a covariance matrix within a class defined by

[Eq. 27]

$$\Sigma=w_1\Sigma_1+w_2\Sigma_2$$

and $w_1$ and $w_2$ denote class mixture ratios.

The Bhattacharyya distance may be calculated in accordance with the equation below.

$$D = \frac{1}{8}(\mu_1-\mu_2)^T \left[\frac{\sum_1+\sum_2}{2}\right]^{-1}(\mu_1-\mu_2) + \frac{1}{2}\ln\frac{\left|\frac{\sum_1+\sum_2}{2}\right|}{\sqrt{|\Sigma_1||\Sigma_2|}} \quad [\text{Eq. 28}]$$

The Kullback-Leibler distance may be calculated in accordance with the equation below.

$$D = \int p_1(x)\ln\left[\frac{p_1(x)}{p_2(x)}\right]dx \quad [\text{Eq. 29}]$$

Here, $P_i$ (i=1, 2) denotes an average vector $\mu_i$, a multidimensional normal distribution of the covariance matrix $\Sigma_i$.

The symmetrical Kullback-Leibler distance may be calculated in accordance with the equation below.

$$D = \frac{1}{2}\int p_1(x)\ln\left[\frac{p_1(x)}{p_2(x)}\right]dx + \frac{1}{2}\int p_2(x)\ln\left[\frac{p_2(x)}{p_1(x)}\right]dx \quad [\text{Eq. 30}]$$

The absolute distance may be calculated in accordance with the equation below.

[Eq. 31]

$$D=\cdot|p_1(x)-p_2(x)|dx$$

When quantification is carried out using the spread of a chromosome territory, for example, a method in which the form of the chromosome territory is approximated using the normal distribution may be used. The direction and the size of the spread of the chromosome territory may thereby be quantified. Specifically, with regard to an original image, a luminance value is considered to be the extent of the probability of a chromosome territory being present, and approximation is carried out by a mixed normal distribution. This processing may be carried out with the same procedure as that of the above-mentioned chromosome territory extraction method by the extraction processing unit 104. In this process, the coordinates of each pixel on an image are considered to be a 2-dimensional probability vector, and a luminance value at that position is considered to be a probability value. In order to treat the luminance as a probability value, the sum of luminance values of all the pixels in the image is determined, and the luminance value of each pixel is divided by the sum so as to carry out normalization. In this way, the form of the chromosome territory is quantified.

The chromosome territory is present in the cell nucleus with a certain degree of spread, and it is thought that the form of this spread is related to ease of interaction between chromosomes or with the exterior through the nuclear membrane. Therefore, when quantifying the positioning state of the chromosome territory, it is expected that by taking into consideration the spread of the chromosome territory, the cell state can be evaluated with good accuracy.

When quantification is carried out using the positioning direction between chromosome territories, a principal axis of each chromosome territory may be detected, and a result of quantifying an angle formed by these principal axes may be used. The principal axis of the chromosome territory may be calculated by, for example, a normal distribution as described above. In this way, by approximating the form of the chromosome territory using the normal distribution, the principal axis of the spread of each chromosome territory may be identified clearly.

In this process, estimated parameters are as follows.

$$p(w_1, \mu_1, \Sigma_1, w_2, \mu_2, \Sigma_2) = w_1 \times \phi(\mu_1, \Sigma_1) + w_2 \times \phi(\mu_2, \Sigma_2)$$

Here, $\phi((\mu, \Sigma)$ denotes a two-dimensional normal distribution, $\mu$ denotes an average value, and $\Sigma$ denotes a covariance matrix. The parameter w obtained as a result of the above denotes the ratio of the size of the spread, $\mu$ denotes the position of the center of the spread, and $\Sigma$ denotes the principal axis of the spread. Furthermore, by decomposing the covariance matrix into eigenvalues, the principal axis of the spread is specifically obtained. By quantifying the form as described above, the positioning state of the chromosome territories can be expressed numerically.

When the positioning state of two chromosome territories is considered, it is thought that in a case in which the principal axes of the spread of the two chromosome territories are parallel to each other, an area of interaction is larger and they have more influence on each other compared with a case in which they are perpendicular to each other. Therefore, when the positioning state of a chromosome territory is quantified, by taking into consideration the form of the spread or the positioning direction of the chromosome territory, it can be expected that a cell state may be evaluated with good accuracy.

In a case in which the distance between a chromosome territory and a reference point within a cell is quantified, the reference point within a cell may be on the nuclear membrane or at the center of gravity. Furthermore, the nuclear membrane referred to in this case may be the surface of a reference sphere calculated by the above-mentioned method. In general, it is known that, when a chromosome is present in an outer edge part of the cell nucleus, it is in a more genetically active state than when it is present in a central part. Therefore, it can be expected that, by quantifying the distance between the chromosome territory and the cell nucleus membrane or the distance between the chromosome territory and the cell nucleus membrane, the genetic activity of the cell may be evaluated.

The quantification processing unit 106 may quantify a positioning state of the chromosome territory using the above-mentioned methods singly or in a combination of a plurality thereof. By use of the results of quantification by the plurality of methods, a cell state can be evaluated in further detail.

(Evaluation (S26))

Evaluation of a cell state may be carried out by various methods, but by subjecting the quantification results obtained for a plurality of samples to statistical processing and comparing the results of the statistical processing, the cell state of a particular sample may be evaluated.

Figure 13:
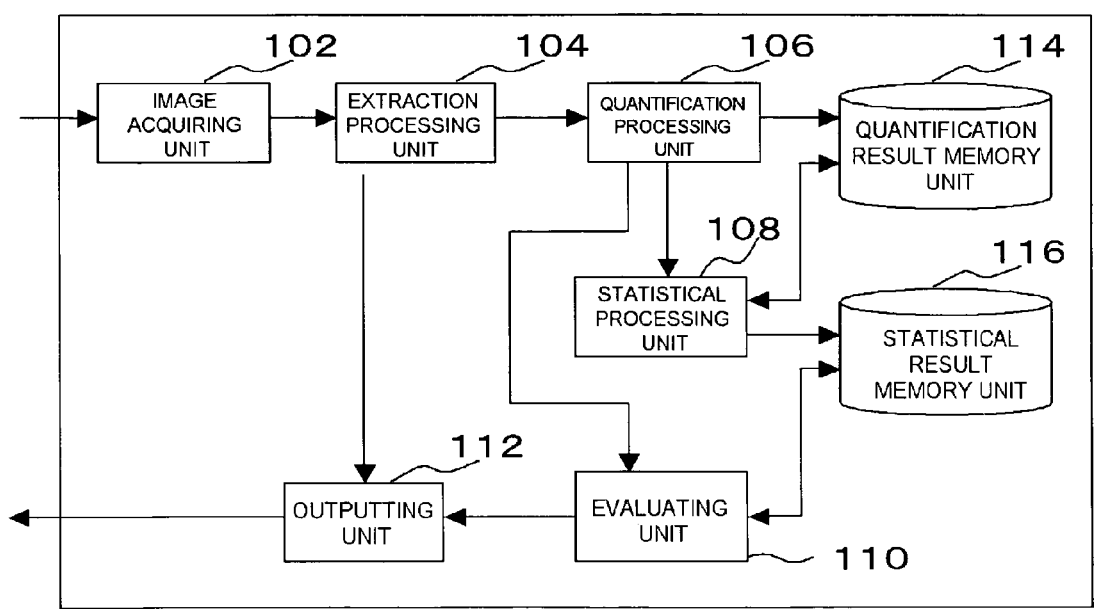
[FIG. 13] A block diagram showing another example of the evaluation device.

Statistical processing may employ various methods; for example, the statistical processing unit 108 may calculate a standard value of the results of quantification of the positioning state of the chromosome territory of a plurality of samples. In this case, as the standard value, an average value of the results of quantification of the positioning state may be used. When a standard value is calculated in this way, by comparing a result of quantification of a positioning state of the chromosome territory of a particular sample with the standard value, the cell state of the particular sample may be evaluated. In this case, the evaluation device 100 may include, as shown in FIG. 13, the statistical processing unit 108 and a statistical result memory unit 116 in addition to the constitution shown in FIG. 2. The statistical processing unit 108, for example, calculates the above-mentioned standard value and stores the standard value in the statistical result memory unit 116. The evaluating unit 110 may evaluate a cell state of a particular sample by comparing a quantification result of the particular sample with the standard value.

Furthermore, the statistical processing may store a result of quantification of a positioning state of the chromosome territory of a sample and a corresponding actual diagnosis result of the provider of the sample. For example, quantification data of a positioning state of the chromosome territory of a cell sampled from an individual with a disease such as cancer and quantification data of a positioning state of the chromosome territory of a cell sampled from an individual without such a disease may be prepared. The evaluating unit 110 may evaluate whether or not a tested individual has a disease by determining which of the quantification data is close to the quantification result of a positioning state of the chromosome territory of a cell sampled from the tested individual.

In the present embodiment, a cell state is evaluated using the result of quantifying a positioning state of the chromosome territory, and the existence of a disease is determined based on the result. Since a change in the positioning state of a chromosome territory occurs in an earlier stage than the stage at which a cell undergoes morphological change, early identification of a disease may be expected.

Furthermore, the statistical processing unit 108 may construct a neural network based on quantification results obtained from a plurality of samples. Here, for example, a plurality of results obtained by quantification by various methods, such as the distance between a plurality of chromosome territories, the spread of the chromosome territory, the positioning direction, or the distance between a chromosome territory and a reference point within a cell may be inputted as input parameters. The evaluating unit 110 may evaluate a cell state by the output of the neural network.

Moreover, the evaluating unit 110 may quantify, using the t-test or the chi-square test, a difference between the result of quantifying a positioning state of a single sample and the result of statistical processing.

EXAMPLE

Using an adipocyte (25th cell and 13th cell), a three-dimensional color image (554×576) was obtained. The color image here was obtained by the 3D-FISH method using probes that complementarily bonded to chromosome 16, chromosome 12, and the nucleus.

Such a color image was inputted by the image acquiring unit 102. The extraction processing unit 104 extracted chromosome territories and the nucleus from the image using the above-mentioned coarse-grained region extraction method with a coarse graining resolution of 8 and a number of classes of 3. The classes were assigned respectively to the chromosome territory of chromosome 12, the chromosome territory of chromosome 16, and the nucleus.

Figure 14:
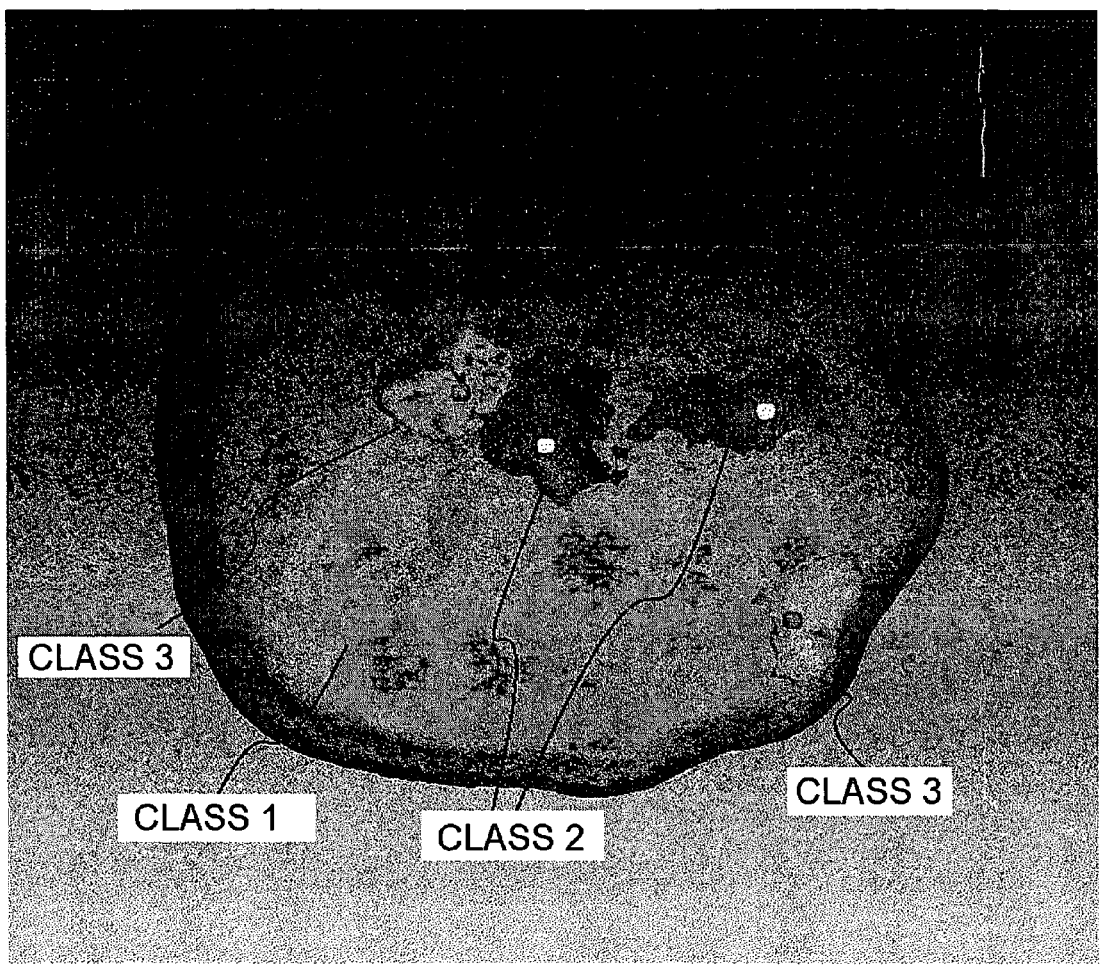
[FIG. 14] A diagram showing a chromosome territory extracted by the extraction processing unit of the present embodiment.

As a result, as shown in FIG. 14, the chromosome territory (class 1) of chromosome 12, the chromosome territory (class 2) of chromosome 16, and the cell nucleus (class 3) were extracted. FIG. 14 shows the extracted image.

Subsequently, the distance between the center of gravity of the chromosome territory of chromosome 16 and that of the chromosome territory of chromosome 12 was calculated by the quantification processing unit 106. Chromosome 16 and chromosome 12 contain homologous chromosomes, and among these, the shortest distance between chromosome 16 and chromosome 12 was employed. This is because it is surmised that interaction such as translocation occurs at a position where the distance between the chromosome territories is the shortest.

A reference sphere of the cell nucleus extracted from the image data was first calculated, and the chromosome territory of chromosome 12 and the chromosome territory of chromosome 16 were normalized. Here, since the chromosome territory had a substantially flat form, transformation in the z direction was not carried out, and two-dimensional transformation was carried out. When three-dimensional transformation is carried out, the same processing procedure may be carried out.

After transformation was carried out in this way, the distance between the center of gravity of chromosome 12 and that of chromosome 16 was calculated for each of the 25th cell and the 13th cell. It was found that the distance between the centers of gravity in the 25th cell was 3.38 μm, and the distance between the centers of gravity in the 13th cell was 4.12 μm.

Figure 15:
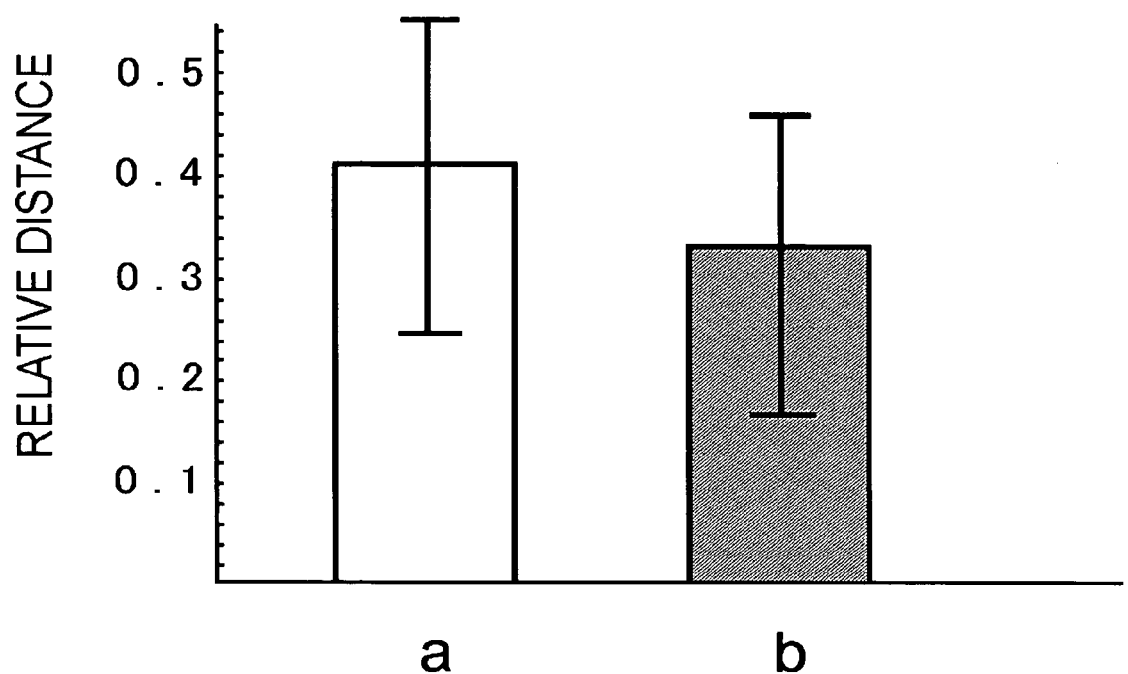
[FIG. 15] A diagram in which, in groups of cells before cytodifferentiation and after cytodifferentiation, distances between the centers of gravity of territories of chromosome 12 and chromosome 16 at the closest position are compared as a relative value to a standardized nuclear radius.

An example in which the distance between centers of gravity of chromosome territories was statistically compared among a group of cells is next shown in FIG. 15. The ordinate of FIG. 15 is a relative value obtained by normalizing the distance between the centers of gravity of territories of chromosome 12 and chromosome 16 in the closest position, using a standardized nuclear radius. a denotes the relative distance (0.41) between chromosome 12-16 territories among a group of cells prior to cytodifferentiation (prior to cell maturing), and b denotes the relative distance (0.33) between chromosome 12-16 territories among a group of cells subsequent to the cytodifferentiation (subsequent to cell maturing). It was clear from this that the chromosome territories in the closest position moved significantly ($p<0.05$) closer to each other subsequent to cytodifferentiation. This result was first obtained by applying the standardization method described in the embodiment to a group of cells having different sizes and forms.

An example in which a change in chromosome positioning, which is difficult to identify by a normal measurement method, has been clarified by standardization of the cell nucleus form in accordance with the embodiment is now illustrated.

Figure 16:
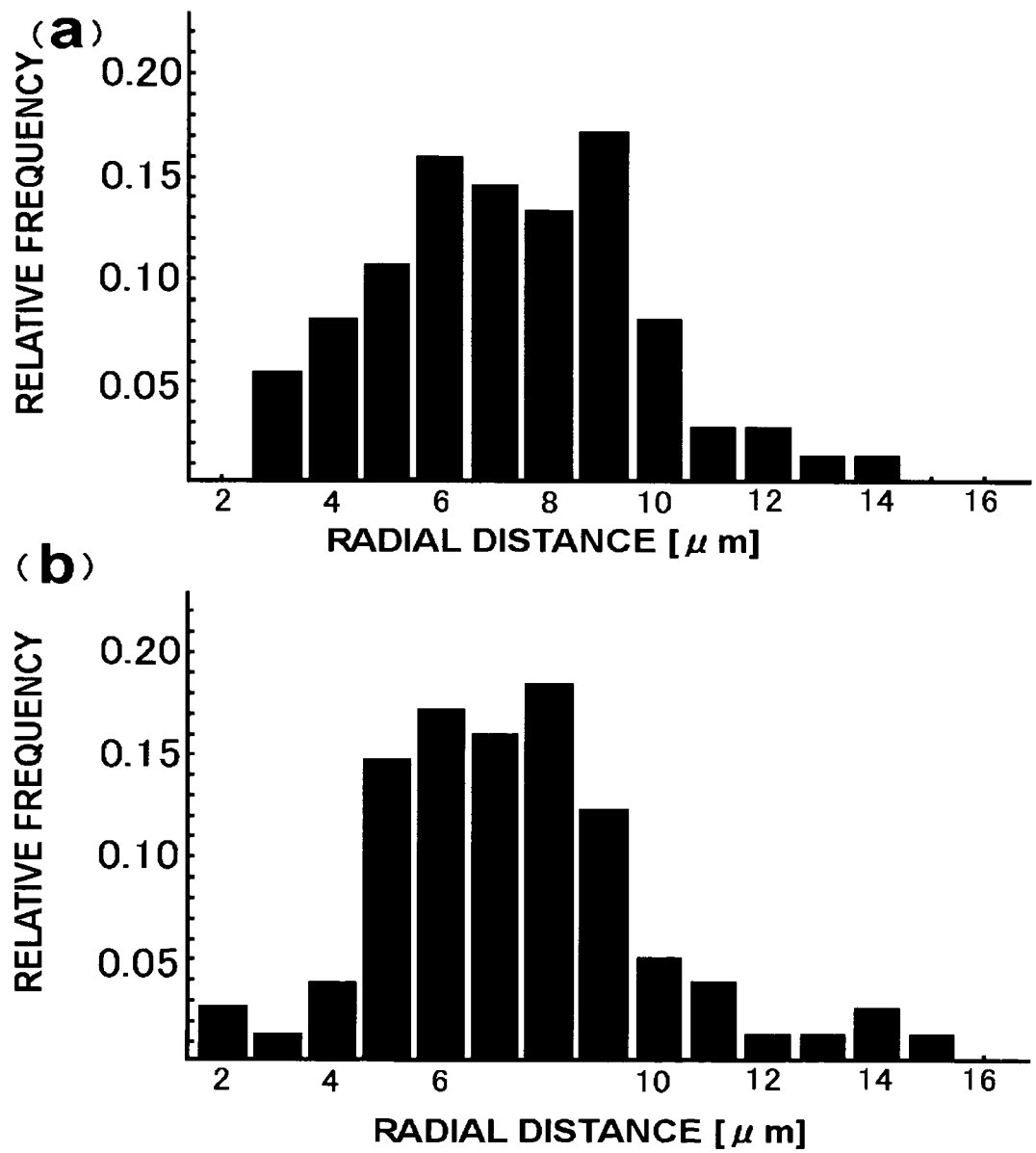
[FIG. 16] A diagram showing radial distributions of chromosome 12, prior to standardization of nuclear form, before cytodifferentiation and after cytodifferentiation.

FIG. 16 is a radial distribution within a nucleus of the chromosome 12 position. FIG. 16($a$) is a diagram showing a radial distribution prior to cytodifferentiation (prior to cell maturing), and FIG. 16($b$) is a diagram showing a radial distribution subsequent to cytodifferentiation (subsequent to cell maturing). The abscissa denotes the distance (μm) from the center of gravity of the nucleus, and the ordinate denotes the relative frequency. Since the nuclear shape differs in normal measurement, the distance from the center of gravity is expressed here using an actual measurement. A change in chromosome positioning prior to and subsequent to cytodifferentiation is not clear from this figure.

Figure 17:
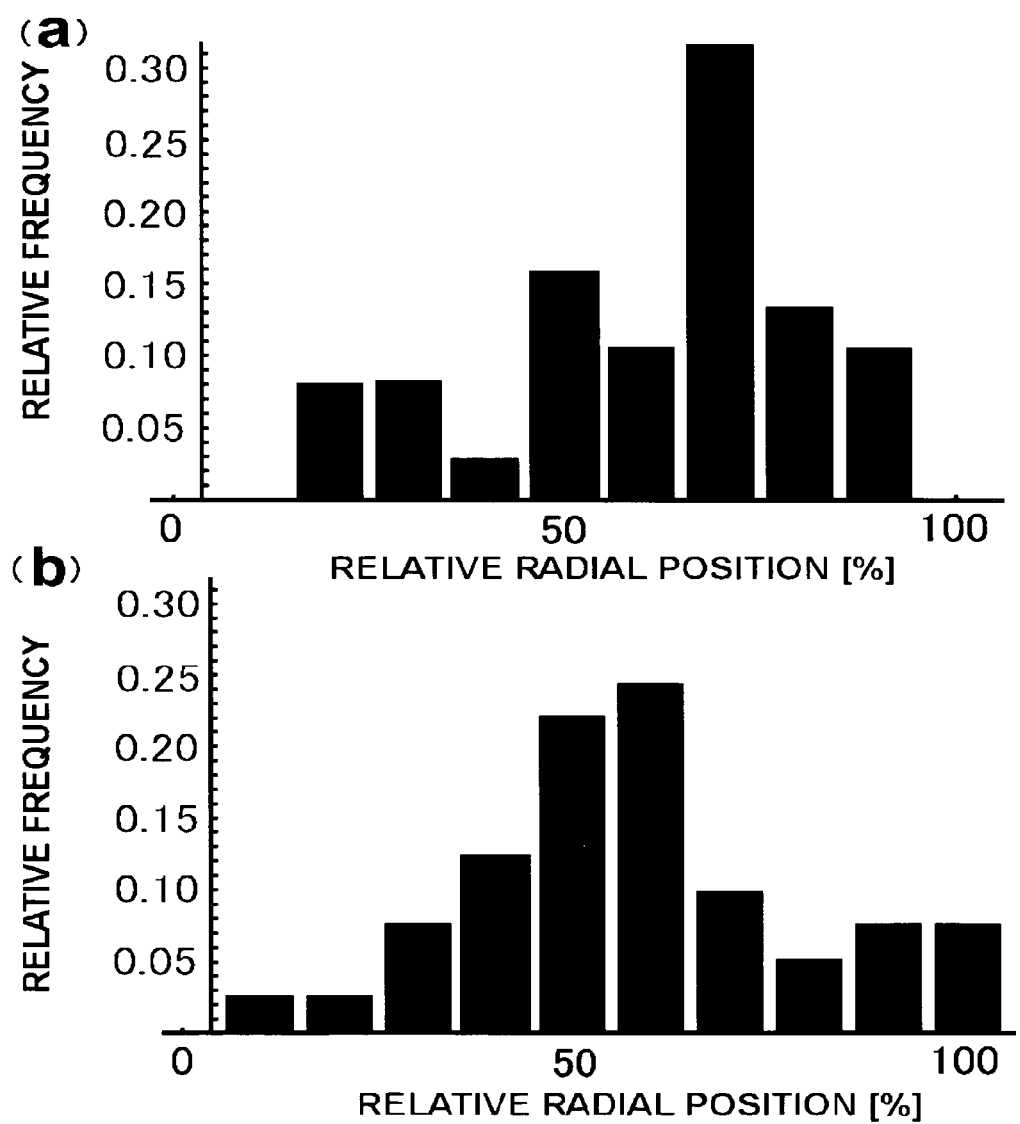
[FIG. 17] A diagram showing radial distributions of chromosome 12, subsequent to standardization of nuclear form, before cytodifferentiation and after cytodifferentiation.

In contrast, a radial distribution of chromosome 12 after carrying out the standardization explained in the present embodiment is shown in FIG. 17. FIG. 17(a) shows a radial distribution prior to cytodifferentiation, and FIG. 17(b) shows a radial distribution subsequent to cytodifferentiation. Furthermore, the abscissa denotes relative positional distance (%) from the center of gravity of the nucleus, and the ordinate denotes relative frequency. By the standardization of nucleus form described in the present embodiment, the chromosome radial position can be compared for all cells using the same criteria, and it has been found that the distribution is significantly ($p<0.05$) displaced toward the interior of the nucleus subsequent to cytodifferentiation.

As hereinbefore described, in accordance with the method of the present embodiment, a change of a cell state, which could not originally be detected, could be identified.

The present invention is explained by way of an embodiment and an example. The embodiment and example are illustrative only and it can be understood by a person skilled in the art that various modification examples are possible and such modification examples are included in the scope of the present invention.

The invention claimed is:

1. A method of measuring a chromosome territory, the method detecting a difference in state between a plurality of cells containing a chromosome territory by measuring a desired area of said cells from information obtained from a plurality of images formed from a plurality of pixels having an attribute value, the images being taken of said plurality of cells, the method comprising:
   extracting said chromosome territory from an image;
   standardizing a positioning state of said chromosome territory and then quantifying said positioning state; and
   detecting a difference in state between said cells based on the quantified positioning state of said chromosome territory,
   said extracting including:
      classifying said image into a plurality of classes; and
      extracting any of said classes from said image as a region representing said chromosome territory, and
      said classifying including:
         setting an initial value for an attribute parameter indicating an attribute value of each of said classes and for a mixture ratio of each of said classes;
         calculating, using a processor, based on said attribute parameter and said mixture ratio a class membership probability of each of said plurality of pixels being classified into each of said classes;
         calculating, using a processor, an evaluation function representing a goodness of estimation based on said membership probability and a mixture probability distribution defined by said attribute parameter and said mixture ratio and determining whether or not said evaluation function satisfies predetermined conditions;
         updating said attribute parameter and said mixture ratio when said evaluation function does not satisfy said predetermined conditions; and
         classifying said plurality of pixels into any of said plurality of classes based on said attribute parameter and said mixture ratio when said evaluation function satisfies said predetermined conditions.

2. The measurement method as set forth in claim 1,
   wherein in said chromosome territory extraction, in addition to extracting a nucleus of said cell said chromosome territory contained in said nucleus is extracted, and
   said positioning state quantification comprises standardizing a form of said nucleus and transforming coordinates of said chromosome territory based on a change in form between said nucleus before standardization and said nucleus after standardization.

3. The measurement method as set forth in claim 1 or claim 2, the method further comprising:
   statistically processing quantification results of said positioning state of a plurality of cells,
   wherein in said detection of difference in state between cells, a difference in state of a single cell is detected based on a result of quantifying said positioning state of said single cell and a result of said statistical processing.

4. The detection method as set forth in claim 3,
   wherein said statistical processing comprises calculating a standard value of a quantification result of said positioning state based on a result of quantifying said positioning state of a plurality of cells, and
   in said detection of difference in state between cells, a difference in state of a single cell is detected based on a result of quantifying said positioning state of said single cell and said standard value.

5. The measurement method as set forth in claim 4,
   wherein said positioning state comprises at least one of a relative position of said chromosome territory within a nucleus of said cell, a direction of a principal axis of said chromosome territory, and a spread of said chromosome territory.

6. The measurement method as set forth in claim 1,
   wherein said class membership probability calculation comprises:
      decomposing said plurality of pixels into a plurality of partial spaces according to an attribute value of said pixels;
      calculating a coarse-grained empirical probability distribution representing a proportion of pixels contained in said partial space; and
      calculating based on said attribute parameter and said mixture ratio a coarse-grained class membership probability of each of said partial spaces being classified into each of said classes; and
   said evaluation function calculation comprises calculating a coarse-grained mixture probability distribution by averaging, within said partial space, mixture probability distributions defined by said attribute parameter and said mixture ratio, said evaluation function being calculated based on said coarse-grained empirical probability distribution, said coarse-grained mixture probability distribution, and said coarse-grained class membership probability.

7. A method of measuring a chromosome territory, the method detecting a difference in state between a plurality of cells containing a chromosome territory by measuring a desired area of said cells from information obtained from a plurality of images formed from a plurality of pixels having an attribute value, the images being taken of said plurality of cells, the method comprising:
   extracting a plurality of chromosome territories from an image;
   quantifying a positioning state of said plurality of chromosome territories;
   statistically processing results of quantifying said positioning state of a plurality of cells; and detecting a difference in state of a single cell based on a result of quantifying said positioning state of said single cell and a result of said statistical processing, said extracting including:

classifying said image into a plurality of classes; and extracting any of said classes from said image as a region representing said chromosome territory, and said classifying including:

setting an initial value for an attribute parameter indicating an attribute value of each of said classes and for a mixture ratio of each of said classes;

calculating, using a processor, based on said attribute parameter and said mixture ratio a class membership probability of each of said plurality of pixels being classified into each of said classes;

calculating, using a processor, an evaluation function representing a goodness of estimation based on said membership probability and a mixture probability distribution defined by said attribute parameter and said mixture ratio and determining whether or not said evaluation function satisfies predetermined conditions;

updating said attribute parameter and said mixture ratio when said evaluation function does not satisfy said predetermined conditions; and classifying said plurality of pixels into any of said plurality of classes based on said attribute parameter and said mixture ratio when said evaluation function satisfies said predetermined conditions.

8. The measurement method as set forth in claim 7, wherein said positioning state comprises at least one of a distance between said plurality of chromosome territories and a positioning direction of said plurality of chromosome territories.

9. The measurement method as set forth in claim 7 or 8, wherein said quantifying comprises calculating a distance between said plurality of chromosome territories.

10. The measurement method as set forth in claim 9, wherein said distance calculation comprises:

calculating a center of gravity of each of said plurality of chromosome territories; and calculating a distance between said centers of gravity.

11. The measurement method as set forth in claim 10, wherein said quantifying comprises quantifying a positioning direction of said plurality of chromosome territories.

12. The measurement method as set forth in claim 10, wherein said chromosome territory positioning state quantification further comprises standardizing a positioning state of said chromosome territory, and after standardizing the positioning state of said chromosome territory, quantifying said positioning state.

13. The measurement method as set forth in claim 10, wherein said positioning state comprises at least one of a relative position of said chromosome territory within a nucleus of said cell, a direction of a principal axis of said chromosome territory, and a spread of said chromosome territory.

14. The measurement method as set forth in any one of claim 7 or 8, wherein said quantifying comprises quantifying a positioning direction of said plurality of chromosome territories.

15. The measurement method as set forth in claim 14, wherein said positioning direction quantification comprises:

detecting a principal axis of each of said plurality of chromosome territories; and calculating an angle of said principal axis.

16. The measurement method as set forth in claim 15, wherein said chromosome territory positioning state quantification further comprises standardizing a positioning state of said chromosome territory, and after standardizing the positioning state of said chromosome territory, quantifying said positioning state.

17. The measurement method as set forth in claim 15, wherein said positioning state comprises at least one of a relative position of said chromosome territory within a nucleus of said cell, a direction of a principal axis of said chromosome territory, and a spread of said chromosome territory.

18. A method of measuring a chromosome territory, the method detecting a difference in state between a plurality of cells containing a chromosome territory by measuring a desired area of said cells in information of a plurality of images formed from a plurality of pixels having an attribute value, the images being taken of said plurality of cells, the method comprising:

extracting each of a nucleus of said cells and said chromosome territory from said image;

quantifying a positioning state of said nucleus and said chromosome territory;

statistically processing a result of quantifying said positioning state of a plurality of cells; and detecting a difference in state of a single cell based on a result of quantifying said positioning state of said single cell and a result of said statistical processing, said extracting including:

classifying said image into a plurality of classes; and extracting any of said classes from said image as a region representing said chromosome territory, and said classifying including:

setting an initial value for an attribute parameter indicating an attribute value of each of said classes and for a mixture ratio of each of said classes;

calculating, using a processor, based on said attribute parameter and said mixture ratio a class membership probability of each of said plurality of pixels being classified into each of said classes;

calculating, using a processor, an evaluation function representing a goodness of estimation based on said membership probability and a mixture probability distribution defined by said attribute parameter and said mixture ratio and determining whether or not said evaluation function satisfies predetermined conditions;

updating said attribute parameter and said mixture ratio when said evaluation function does not satisfy said predetermined conditions; and classifying said plurality of pixels into any of said plurality of classes based on said attribute parameter and said mixture ratio when said evaluation function satisfies said predetermined conditions.

19. The measurement method as set forth in claim 18, wherein said quantifying comprises calculating a distance between a reference point within said nucleus and said chromosome territory.

20. The measurement method as set forth in any one of claim 7, 8, 18 or 19,
wherein said chromosome territory positioning state quantification further comprises standardizing a positioning state of said chromosome territory, and after standardizing the positioning state of said chromosome territory, quantifying said positioning state.

21. The measurement method as set forth in claim 20,
wherein said statistical processing comprises calculating a standard value of a quantification result of said positioning state based on a result of quantifying said positioning state of a plurality of cells; and
in said detection of difference in state of a single cell, a difference in state of a single cell is detected based on a result of quantifying said positioning state of said single cell and said standard value.

22. The measurement method as set forth in claim 21,
wherein said positioning state comprises at least one of a relative position of said chromosome territory within a nucleus of said cell, a direction of a principal axis of said chromosome territory, and a spread of said chromosome territory.

23. The measurement method as set forth in any one of claim 1, 2, 7, 8, 18 or 19,
wherein said positioning state comprises at least one of a relative position of said chromosome territory within a nucleus of said cell, a direction of a principal axis of said chromosome territory, and a spread of said chromosome territory.

* * * * *

UNITED STATES PATENT AND TRADEMARK OFFICE
CERTIFICATE OF CORRECTION

PATENT NO.       : 7,840,357 B2
APPLICATION NO.  : 10/565669
DATED            : November 23, 2010
INVENTOR(S)      : Tomoharu Kiyuna et al.

It is certified that error appears in the above-identified patent and that said Letters Patent is hereby corrected as shown below:

Column 10, Line 32: Delete "$(x_{j|}50, 10)$" and insert -- $(x_j|50, 10)$ --

Column 13, Line 6: Delete "$f_j(\phi_i) = f(\tilde{T}_j|\phi_i)$" and insert -- $f_j(\phi_i) = f(\tilde{x}_j|\phi_i)$ --

Column 27, Line 5: Delete "$(\mu_1\mu_2)$" and insert -- $(\mu_1-\mu_2)$ --

Column 27, Line 45: Delete "$\cdot |p_1(x) - p_2(x)| dx$" and insert -- $\int |p_1(x) - p_2(x)| dx$ --

Signed and Sealed this
Seventeenth Day of May, 2011

David J. Kappos
*Director of the United States Patent and Trademark Office*